(12) United States Patent
Joshi et al.

(10) Patent No.: US 10,916,041 B2
(45) Date of Patent: Feb. 9, 2021

(54) METHOD FOR DEPTH IMAGE DI CODING

(71) Applicant: Samsung Electronics Co., Ltd., Suwon-si (KR)

(72) Inventors: Rajan Laxman Joshi, San Diego, CA (US); Madhukar Budagavi, Plano, TX (US)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 16/357,133

(22) Filed: Mar. 18, 2019

(65) Prior Publication Data

US 2019/0304139 A1    Oct. 3, 2019

Related U.S. Application Data

(60) Provisional application No. 62/681,401, filed on Jun. 6, 2018, provisional application No. 62/655,888, filed on Apr. 11, 2018, provisional application No. 62/650,625, filed on Mar. 30, 2018.

(51) Int. Cl.
G06T 9/00         (2006.01)
G06T 17/20        (2006.01)

(52) U.S. Cl.
CPC .............. *G06T 9/001* (2013.01); *G06T 17/20* (2013.01); *G06T 2210/56* (2013.01)

(58) Field of Classification Search
CPC ...... G06T 17/20; G06T 2210/56; G06T 9/001
USPC ......................................................... 345/420
See application file for complete search history.

(56) References Cited

U.S. PATENT DOCUMENTS

| | | | |
|---|---|---|---|
| 9,514,522 B2 | 12/2016 | Fu et al. | |
| 9,906,793 B2 | 2/2018 | Fu et al. | |
| 2001/0031003 A1* | 10/2001 | Sawhney | H04N 19/33 375/240.14 |
| 2005/0018901 A1* | 1/2005 | Kaufmann | G06T 17/20 382/154 |

(Continued)

FOREIGN PATENT DOCUMENTS

KR     10-2015-0089364 A    8/2015

OTHER PUBLICATIONS

Sullivan et al., "Standardized Extensions of High Efficiency Video Coding (HEVC)", IEEE Journal of Selected Topics in Signal Processing, vol. 7, No. 6, Dec. 2013, pp. 1001-1016.

(Continued)

*Primary Examiner* — Ke Xiao
*Assistant Examiner* — Kim Thanh T Tran

(57) ABSTRACT

A method for point cloud encoding includes generating, for a 3D point cloud, first and second frames representing the 3D point cloud at different depths, wherein the first and second frames each include a set of patches representing a cluster of points of the 3D point cloud. The method also includes encoding the first frame. After encoding the first frame, the method includes decoding the first frame. The method further includes generating a third frame representing a difference between corresponding points of the second frame and the decoded first frame. The method additionally includes encoding the third frame. The method also includes generating a compressed bitstream including the encoded first frame and the encoded third frame. The method further includes transmitting the compressed bitstream.

20 Claims, 15 Drawing Sheets

(56) References Cited

U.S. PATENT DOCUMENTS

| | | | |
|---|---|---|---|
| 2007/0223573 A1* | 9/2007 | Park | H04N 19/105 375/240.1 |
| 2009/0232470 A1* | 9/2009 | Uchida | G11B 27/034 386/283 |
| 2011/0216833 A1 | 9/2011 | Chen et al. | |
| 2011/0273533 A1 | 11/2011 | Ngo et al. | |
| 2012/0230400 A1* | 9/2012 | Lu | H04N 19/56 375/240.12 |
| 2012/0319150 A1* | 12/2012 | Shimomura | H01L 24/97 257/98 |
| 2015/0054916 A1 | 2/2015 | Lee et al. | |
| 2016/0007005 A1 | 1/2016 | Konieczny et al. | |
| 2016/0100179 A1* | 4/2016 | He | H04N 19/146 375/240.25 |
| 2017/0118471 A1* | 4/2017 | Eslami | H04N 19/124 |

OTHER PUBLICATIONS

International Search Report dated Jul. 3, 2019 in connection with International Patent Application No. PCT/KR2019/003733, 3 pages.
Written Opinion of the International Searching Authority dated Jul. 3, 2019 in connection with International Patent Application No. PCT/KR2019/003733, 5 pages.

* cited by examiner

|  |  | BDBR (JCTVC-AC0026) | | | | | |
|---|---|---|---|---|---|---|---|
|  |  | Geo. PSNR | | Color | | | |
|  |  | D1 (dB) | D2 (dB) | Y PSNR (dB) | U PSNR (dB) | V PSNR (dB) | |
| Class A | Queen | -8.10% | -9.00% | -1.90% | -1.30% | -2.30% | |
|  | 8i VFB – Loot | -23.90% | 1.10% | 0.20% | 2.00% | 2.00% | |
|  | 8i VFB – Red_and_Black | -19.90% | 3.40% | -0.60% | 1.00% | 0.40% | |
|  | 8i VFB – Soldier | -21.40% | 5.10% | -1.10% | 1.80% | 2.40% | |
| Class B | 8i VFB – Long_dress | -21.60% | 5.80% | -3.00% | 1.50% | 1.00% | |
|  | Avg. for Class A | -18.30% | 0.10% | -0.80% | 0.90% | 0.60% | |
|  | Avg. for Class B | -21.60% | 5.80% | -3.00% | 1.50% | 1.00% | |
|  | Overall Average | -19.00% | 1.30% | -1.30% | 1.00% | 0.70% | |

FIG. 8A

|  |  | BDBR (JCTVC-AC0026) | | | | | |
|---|---|---|---|---|---|---|---|
|  |  | Geo. PSNR | | Y PSNR (dB) | Color | | |
|  |  | D1 (dB) | D2 (dB) | | U PSNR (dB) | V PSNR (dB) | |
|  | Queen | -17.60% | -18.30% | -1.70% | 0.80% | -0.20% |  |
| Class A | 8i VFB – Loot | -27.70% | -6.70% | 1.80% | 3.80% | 3.80% |  |
|  | 8i VFB – Red_and_Black | -25.30% | -5.70% | 0.50% | 2.90% | 1.60% |  |
|  | 8i VFB – Soldier | -28.10% | -5.70% | -0.40% | 3.20% | 3.30% |  |
| Class B | 8i VFB – Long_dress | -30.00% | -6.90% | -3.70% | 1.70% | 1.00% |  |
|  | Avg. for Class A | -24.60% | -9.10% | 0.10% | 2.70% | 2.10% |  |
|  | Avg. for Class B | -30.00% | 6.90% | -3.70% | 1.70% | 1.00% |  |
|  | Overall Average | -25.70% | -8.70% | -0.70% | 2.50% | 1.90% |  |

| | | BDBR (JCTVC-AC0026) | | | | |
|---|---|---|---|---|---|---|
| | | Geo. PSNR | | | Color | |
| | | D1 (dB) | D2 (dB) | Y PSNR (dB) | U PSNR (dB) | V PSNR (dB) |
| Class A | Queen | -18.10% | -19.00% | -1.40% | 0.90% | 0.50% |
| | 8i VFB – Loot | -26.90% | -4.80% | 2.60% | 5.10% | 5.10% |
| | 8i VFB – Red_and_Black | -25.10% | -5.20% | 1.00% | 3.40% | 2.20% |
| | 8i VFB – Soldier | -30.80% | -5.90% | 0.40% | 3.60% | 4.80% |
| Class B | 8i VFB – Long_dress | -32.30% | -6.90% | -4.20% | 2.10% | 1.40% |
| | Avg. for Class A | -25.20% | -8.70% | 0.40% | 3.30% | 3.20% |
| | Avg. for Class B | -32.30% | -8.40% | -4.20% | 2.10% | 1.40% |
| | Overall Average | -26.70% | -8.40% | -0.50% | 3.00% | 2.80% |

FIG. 8C

METHOD FOR DEPTH IMAGE DI CODING

CROSS-REFERENCE TO RELATED APPLICATION AND CLAIM OF PRIORITY

This application claims priority under 35 U.S.C. § 119(e) to: U.S. Provisional Patent Application No. 62/650,625 filed on Mar. 30, 2018, U.S. Provisional Patent Application No. 62/655,888 filed on Apr. 11, 2018, and U.S. Provisional Patent Application No. 62/681,401 filed on Jun. 6, 2018. The above-identified provisional patent applications are hereby incorporated by reference in their entirety.

TECHNICAL FIELD

This disclosure relates generally to multimedia data. More specifically, this disclosure relates to an apparatus and a method for compressing point clouds.

BACKGROUND

Three hundred sixty degree (360°) video is emerging as a new way of experiencing immersive video due to the ready availability of powerful handheld devices such as smartphones. 360° video enables immersive "real life," "being there" experience for consumers by capturing the 360° view of the world. Users can interactively change their viewpoint and dynamically view any part of the captured scene or object they desire. Display and navigation sensors track head movement in real-time to determine the region of the 360° video that the user wants to view. 360° video provides a three Degrees of Freedom (3DoF) immersive experience. Six Degrees of Freedom (6DoF) is the next level of immersive experience where in the user can turn his head as well as move around in a virtual/augmented environment. Multimedia data that is three-dimensional (3D) in nature, such as point clouds, is needed to provide 6DoF experience.

Point clouds and meshes are a set of 3D points that represent a model of a surface of an object or a scene. Point clouds are common in a variety of applications such as gaming, 3D maps, visualizations, medical applications, augmented reality, virtual reality, autonomous driving, multi-view replay, 6DoF immersive media, to name a few. Point clouds, if uncompressed, generally require a large amount of bandwidth for transmission. Due to the large bitrate requirement, point clouds are often compressed prior to transmission.

SUMMARY

This disclosure provides method for depth image D1 coding.

In a first embodiment, an encoding device for point cloud encoding is provided. The encoding device includes a processor and a communication interface. The processor is configured to generate, for a three-dimensional (3D) point cloud, first and second frames representing the 3D point cloud at different depths, wherein the first and second frames each include a set of patches representing a cluster of points of the 3D point cloud. The processor is also configured to encode the first frame. After encoding the first frame, the processor is configured to decode the first frame. The processor is further configured to generate a third frame representing a difference between corresponding points of the second frame and the decoded first frame. The processor is additionally configured to encode the third frame. The processor is also configured to generate a compressed bitstream including the encoded first frame and the encoded third frame. The communication interface is configured to transmit the compressed bitstream.

In another embodiment a method for point cloud encoding includes generating, for a 3D point cloud, first and second frames representing the 3D point cloud at different depths, wherein the first and second frames each include a set of patches representing a cluster of points of the 3D point cloud. The method also includes encoding the first frame. After encoding the first frame, the method includes decoding the first frame. The method further includes generating a third frame representing a difference between corresponding points of the second frame and the decoded first frame. The method additionally includes encoding the third frame. The method also includes generating a compressed bitstream including the encoded first frame and the encoded third frame. The method further includes transmitting the compressed bitstream.

In yet another embodiment a non-transitory machine-readable medium containing instructions that when executed cause at least one processor of an electronic device to generate, for a three-dimensional (3D) point cloud, first and second frames. The first and second frames represent the 3D point cloud at different depths, wherein the first and second frames each include a set of patches representing a cluster of points of the 3D point cloud. The medium also contains instructions that, when executed, cause the at least one processor to encode the first frame. After encoding the first frame, the medium also contains instructions that, when executed, cause the at least one processor to decode the first frame. The medium further contains instructions that, when executed, cause the at least one processor to generate a third frame representing a difference between corresponding points of the second frame and the decoded first frame. The medium additionally contains instructions that, when executed, cause the at least one processor to encode the third frame. The medium also contains instructions that, when executed, cause the at least one processor to generate a compressed bitstream including the encoded first frame and the encoded third frame. The medium also contains instructions that, when executed, cause the at least one processor to transmit the compressed bitstream.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 8A, 8B, and 8C illustrate example simulation results in accordance with an embodiment of this disclosure;

DETAILED DESCRIPTION

Figure 1:
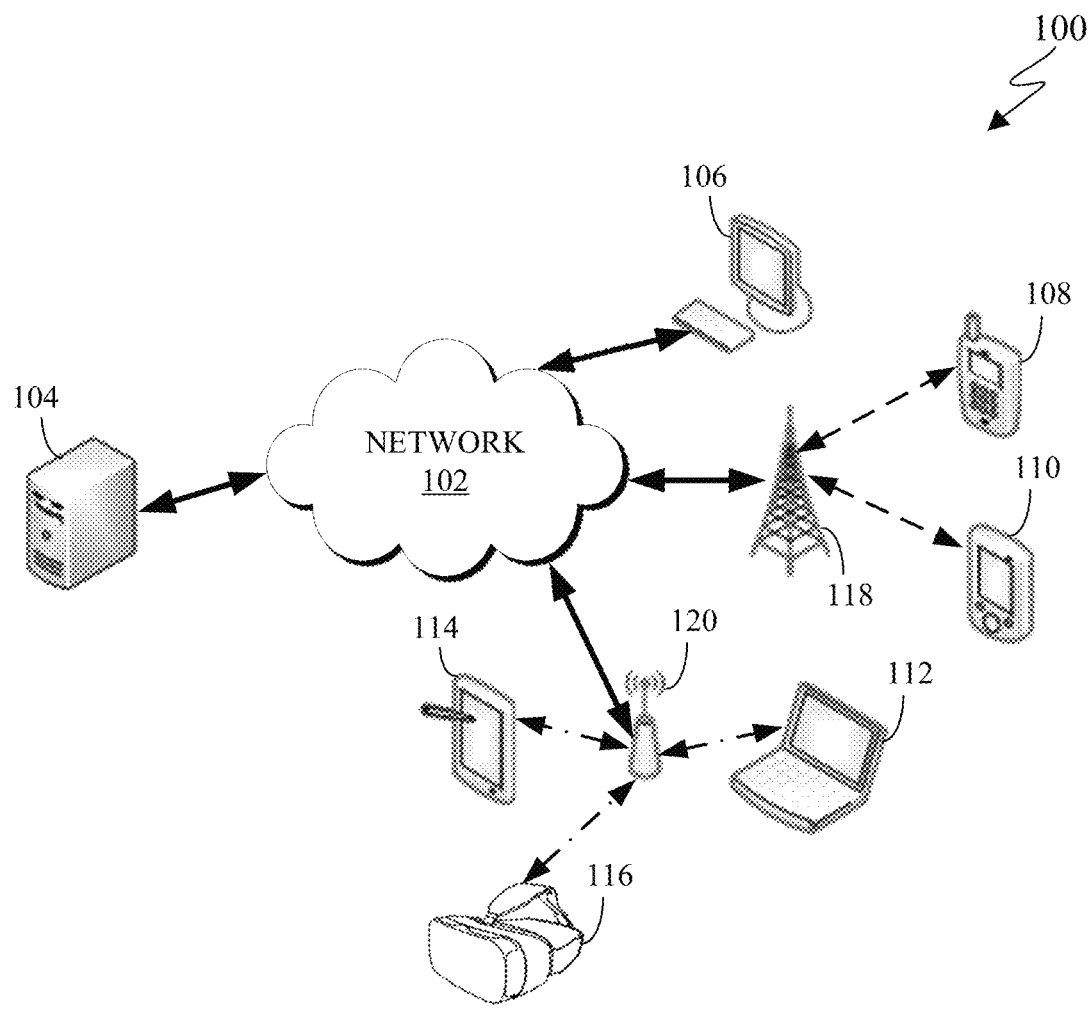
FIG. 1 illustrates an example communication system in accordance with an embodiment of this disclosure.

FIGS. 1 through 9B, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

Augmented reality (AR) is an interactive experience of a real world environment where objects that reside in the real-world environment are augmented with objects, information, or both. Virtual reality (VR) is a rendered version of a visual scene. In certain embodiments, AR and VR include a rendered version of both a visual and an audio scene. The rendering is designed to mimic the visual stimuli, and if available audio sensory stimuli, of the real world as naturally as possible to an observer or user as the individual moves within the limits defined by the application or the AR or VR scene. For example, VR places a user into immersive worlds that interact with and respond to the head movements of a user. At the video level, VR is achieved by providing a video experience that covers as much of the field of view (FOV) as possible together with the synchronization of the viewing angle of the rendered video with the head movements. Although many different types of devices are able to provide such an experience, head-mounted displays (HMD) are popular devices that enable a user to view the VR scene and adjust the displayed content based on movements of the head of the user. Typically, HMDs rely either on dedicated a screens integrated into the device and running with external computers (tethered) or on a device, such as a smartphone, that is inserted into the HMD (untethered). The first approach utilizes lightweight screens and benefiting from a high computing capacity. In contrast, the smartphone-based systems utilize higher mobility and can be less expensive to produce. In both instances, the video experience generated is the same. It is noted that as used herein, the term "user" may denote a human or another device (such as an artificial intelligent electronic device) using the electronic device.

A point cloud is a 3D representation of an object that is similar to an object in a VR or AR environment. Similarly, a point mesh is a 3D representation of an object that is similar to an object in a VR environment. A point cloud or a point mesh can include a scene that includes multiple objects in an environment.

Generally, a point cloud is a collection of data points defined by a coordinate system. For example, in a 3D Cartesian Coordinate System, each point of a point cloud is identified by three coordinates, that of X, Y, and Z. When each point is identified by the three coordinates, a precise location in 3D environment or space is identified, relative to an origin point. The origin point is a location where the X, Y, and Z axes intersect. The points of a point cloud often represent the external surface of the object. Each point of a point cloud is defined by attributes such as a geometric position of each point within the three coordinates and a texture of such as color, intensity, normal, reflectance, and the like.

Similarly, a 3D mesh is a 3D representation of an object that is similar to a point cloud. A 3D mesh illustrates the external structure of an object that is built out of polygons. For example, a 3D mesh is a collection of vertices, edges, and faces that define the shape of an object. For another example, a mesh (or a 3D point cloud) can be rendered on spherical coordinate system. In certain embodiments, each point can be located in the X, Y, Z coordinates that are within a sphere. Similarly, texture coordinates U and V indicate a location of texture of the image. When the object is rendered, the vertices of the mesh, the corresponding texture coordinate, and the texture image are inputted into a graphical processing unit which maps the mesh onto the 3D geometry. The user can have a FOV that is positioned at the center of the virtual sphere and sees a portion of the 360° scene corresponding to the viewport. In certain embodiments, alternative shapes can be used instead of a sphere such as a cube, an icosahedron, an octahedron, and the like. Point clouds and meshes are illustrated and discussed in greater detail below with reference to FIG. 4A.

Point clouds and meshes are commonly used in a variety of applications, including gaming, 3D mapping, visualization, medicine, AR, VR, autonomous driving, multi-view replay, 6 degrees of freedom immersive media, to name a few. As used hereinafter, the term 'point cloud' also refers to a '3D point cloud,' and a '3D mesh'.

Transmitting a point cloud, from one electronic device to another often requires significant bandwidth due to the size and complexity of the data associated with a single point cloud. The transmission of a point cloud often requires specific compression techniques to reduce the size of the data prior to transmission.

As discussed above, a point cloud is a collection of points with attributes, and each attribute requires a certain number of bits. For example, for a point cloud with ten-bit geometry data, thirty bits per point can be used for geometric coordinates (such as an X, Y, and Z coordinate), such that each coordinate is ten bits. Similarly, for a point cloud with eight-bit color data, twenty-four bits per point can be used for a color coordinate (such as red, green, blue (RGB)), such that each coordinate is eight bits color coordinate. Therefore a single point with a ten-bit geometric attribute and an eight-bit color attribute uses fifty-four bits. If a frame includes one million points, the number of bits per frame is fifty-four million bits (fifty-four bits per point times one million points per frame). If no compression occurs and there are thirty frames per second, then 1.62 gigabytes per second (fifty-four million bits per frame times 30 frames per second) are used to transmit a point cloud, from one electronic device to another. Therefore, significant compression is needed to transmit a point cloud, from one electronic device to another.

Embodiments of the present disclosure take into consideration that due to the size constraints or bandwidth, compressing point clouds is necessary to expedite and improve transmission of the point cloud from a source device to another device (such as a user equipment). That is, an uncompressed point cloud uses significant bandwidth for transmission and causes the rendering of the point cloud to be delayed. Certain dedicated hardware components can be used to meet the real-time demands or reduce delays or lags in the rendering of the point cloud; however such hardware components are often expensive. According to embodiments of the present disclosure, compressing a 3D point cloud using a codec decreases the bandwidth for transmission as well as certain types of hardware. In certain embodiments, existing video codecs can be used to compress and reconstruct a point cloud, when the point cloud is projected from its original 3D state onto 2D frames. For example, video codecs such as HEVC, AVC, VP9, VP8, JVNET, and the like can be used to compress a point cloud, when the point cloud is manipulated to fit a 2D frames. For example, the point cloud is manipulated from its original 3D shape to multiple patches that represent the point cloud in 2D.

Therefore, embodiments of the present disclosure provide systems and methods for manipulating a 3-D object such as a point cloud. Manipulating the 3-D object includes projecting the 3-D object onto a 2-D frame, such that the frame can be compressed, transmitted to a display device, and the content within the 2-D frame can be reconstructed into the 3-D object and finally rendered such that the 3-D object can be viewed by a user. Various 2-D compression hardware and software components can compress the 3-D point cloud after the point cloud is projected onto multiple 2-D video frames. When the point cloud is deconstructed to fit on multiple 2D frames, the frames can be transmitted using less bandwidth than transmitting the original point cloud.

A 3D object can be manipulated by an encoder, transmitted to a decoder, which reconstructs the 3D object to be viewed by a user. The encoder projects the 3D object onto one or more 2D frames, compresses the frames, and generates and transmits a compressed bitstream that includes the compressed frames. The decoder, receives the bitstream, decompresses the frames, reconstructs, and renders the 3-D object so a user can view the displayed object.

According to embodiments of the present disclosure, architecture for performing point cloud compression using a video codec is provided. In certain embodiments, conventional 2D video codecs are used to compress, encode, decompress, and decode the 3D point cloud. A point cloud can be deconstructed, and multiple 2D frames are generated that include regular patches of the geometry of each point of the point cloud, as well as various attributes or textures of the point cloud. For example, the point cloud can be deconstructed and mapped onto a 2D frame. The frames can include patches representing the geometric position of each point of the point cloud, as well as various attributes or textures of the points of the point cloud. FIGS. 4B-4D, which are described in greater detail below, illustrate a 3D point cloud that is projected onto 2D frames by creating patches of the point cloud. The 2D frames can be compressed using various video compression, image compression, or both.

Embodiments of the present disclosure include methods and systems for encoding and decoding a point cloud. A geometry frame or a texture frame can each represent a projection of the 3D point cloud taken at different depths, such that each frame is a projection of points from the 3D point cloud at different distances from the projection plane. For example, embodiments of the present disclosure include generating two frames that are related by a surface thickness, such that the two frames represent projections of the 3D point cloud at two separate projection planes. For example, using two frames (or depth images), $D_0$ and $D_1$, The frame $D_0$ can represent a projection of points that are closest to the projection plane, while the frame $D_1$ can represent a projection of points that are further away from the projection plane. The frames $D_0$ and $D_1$ are related by a predefined surface thickness. The surface thickness represents the maximum difference between corresponding $D_0$ and $D_1$ depth values. In certain embodiments, the surface thickness is assigned a value of four. Other integer values can be used, such that the smaller the surface thickness the closer $D_0$ and $D_1$ are to each other and conversely, the larger the surface thickness the further away $D_0$ and $D_1$ are to from other.

FIG. 1 illustrates an example communication system 100 in accordance with an embodiment of this disclosure. The embodiment of the communication system 100 shown in FIG. 1 is for illustration only. Other embodiments of the communication system 100 can be used without departing from the scope of this disclosure.

The communication system 100 includes a network 102 that facilitates communication between various components in the communication system 100. For example, the network 102 can communicate Internet Protocol (IP) packets, frame relay frames, Asynchronous Transfer Mode (ATM) cells, or other information between network addresses. The network 102 includes one or more local area networks (LANs), metropolitan area networks (MANs), wide area networks (WANs), all or a portion of a global network such as the Internet, or any other communication system or systems at one or more locations.

In this example, the network 102 facilitates communications between a server 104 and various client devices 106-116. The client devices 106-116 may be, for example, a smartphone, a tablet computer, a laptop, a personal computer, a wearable device, a HMD, or the like. The server 104 can represent one or more servers. Each server 104 includes any suitable computing or processing device that can provide computing services for one or more client devices, such as the client devices 106-116. Each server 104 could, for example, include one or more processing devices, one or more memories storing instructions and data, and one or more network interfaces facilitating communication over the network 102. As described in more detail below, the server 104 can transmit a compressed bitstream, representing a point cloud, to one or more display devices, such as a client device 106-116. In certain embodiments, each server 104 can include an encoder.

Each client device 106-116 represents any suitable computing or processing device that interacts with at least one server (such as the server 104) or other computing device(s) over the network 102. The client devices 106-116 include a desktop computer 106, a mobile telephone or mobile device 108 (such as a smartphone), a PDA 110, a laptop computer 112, a tablet computer 114, and a HMD 116. However, any other or additional client devices could be used in the communication system 100. Smartphones represent a class of mobile devices 108 that are handheld devices with mobile operating systems and integrated mobile broadband cellular network connections for voice, short message service (SMS), and Internet data communications. As described in more detail below, the HMD 116 can display 360° scenes including one or more point clouds. In certain embodiments, any of the client devices 106-116 can include a decoder.

In this example, some client devices 108-116 communicate indirectly with the network 102. For example, the mobile device 108 and PDA 110 communicate via one or more base stations 118, such as cellular base stations or eNodeBs (eNBs). Also, the laptop computer 112, the tablet computer 114, and the HMD 116 communicate via one or more wireless access points 120, such as IEEE 802.11 wireless access points. Note that these are for illustration only and that each client device 106-116 could communicate directly with the network 102 or indirectly with the network 102 via any suitable intermediate device(s) or network(s). In certain embodiments, the server 104 or any client device 106-116 can be used to compress a point cloud, generate a bitstream that represents the point cloud, and transmit the bitstream to another client device such as any client device 106-116.

In certain embodiments, any of the client devices 106-114 transmit information securely and efficiently to another device, such as, for example, the server 104. Also, any of the client devices 106-116 can trigger the information transmission between itself and server 104. Any of the client devices 106-114 can function as a VR display when attached to a headset via brackets, and function similar to HMD 116. For example, the mobile device 108 when attached to a bracket system and worn over the eyes of a user can function similarly as the HMD 116. The mobile device 108 (or any other client device 106-116) can trigger the information transmission between itself and server 104

In certain embodiments, any of the client devices 106-116 or the server 104 can compress, transmit, receive, render a point cloud, or a combination thereof. For example, the server 104 can then compress and transmit the point cloud data to particular client devices 106-116. For another example, one of the client devices 106-116 can compress and transmit point cloud data to another client device 106-116 or to the server 104.

Although FIG. 1 illustrates one example of a communication system 100, various changes can be made to FIG. 1. For example, the communication system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
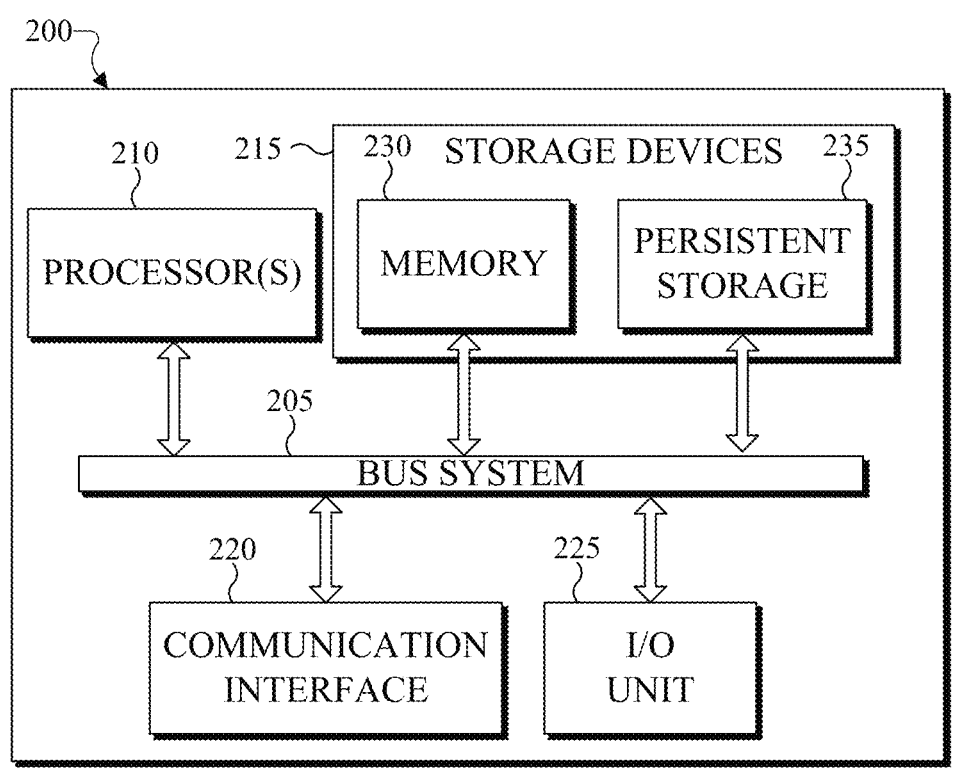
FIGS. 2 and 3 illustrate example electronic devices in accordance with an embodiment of this disclosure.
Figure 3:
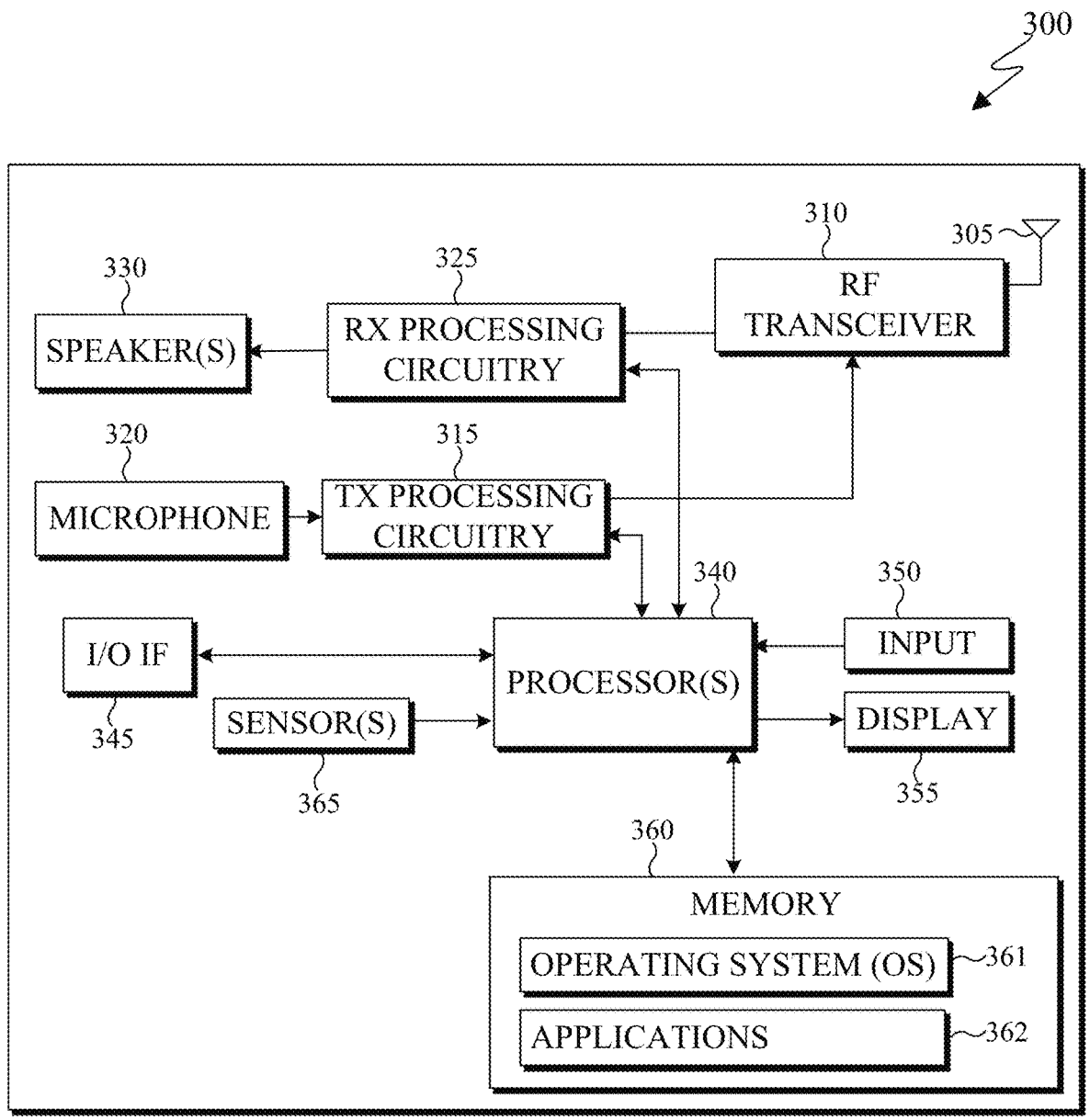

FIGS. 2 and 3 illustrate example electronic devices in accordance with an embodiment of this disclosure. In particular, FIG. 2 illustrates an example server 200, and the server 200 could represent the server 104 in FIG. 1. The server 200 can represent one or more local servers, one or more remote servers, clustered computers, and components that act as a single pool of seamless resources, a cloud-based server, and the like. The server 200 can be accessed by one or more of the client devices 106-116 of FIG. 1.

The server 200 can represent one or more local servers, one or more compression servers, or one or more encoding servers, such as an encoder. As shown in FIG. 2, the server 200 includes a bus system 205 that supports communication between at least one processing device 210, at least one storage device 215, at least one communications interface 220, and at least one input/output (I/O) unit 225.

The processor 210 executes instructions that can be stored in a memory 230. The processor 210 can include any suitable number(s) and type(s) of processors or other devices in any suitable arrangement. Example types of processors 210 include microprocessors, microcontrollers, digital signal processors, field programmable gate arrays, application specific integrated circuits, and discrete circuitry.

The memory 230 and a persistent storage 235 are examples of storage devices 215 that represent any structure(s) capable of storing and facilitating retrieval of information (such as data, program code, or other suitable information on a temporary or permanent basis). The memory 230 can represent a random access memory or any other suitable volatile or non-volatile storage device(s). For example, the instructions stored in the memory 230 can include instructions for decomposing a point cloud into patches, instructions for packing the patches on 2D frames, instructions for compressing the 2D frames, as well as instructions for encoding 2D frames in order to generate a bitstream. The instructions stored in the memory 230 can also include instructions for rendering the point cloud on an omnidirectional 360° scene, as viewed through a VR headset, such as HMD 116 of FIG. 1. The persistent storage 235 can contain one or more components or devices supporting longer-term storage of data, such as a read only memory, hard drive, Flash memory, or optical disc.

The communications interface 220 supports communications with other systems or devices. For example, the communications interface 220 could include a network interface card or a wireless transceiver facilitating communications over the network 102 of FIG. 1. The communications interface 220 can support communications through any suitable physical or wireless communication link(s).

The I/O unit 225 allows for input and output of data. For example, the I/O unit 225 can provide a connection for user input through a keyboard, mouse, keypad, touchscreen, or other suitable input device. The I/O unit 225 can also send output to a display, printer, or other suitable output device. Note, however, that the I/O unit 225 can be omitted, such as when I/O interactions with the server 200 occur via a network connection.

Note that while FIG. 2 is described as representing the server 104 of FIG. 1, the same or similar structure could be used in one or more of the various client devices 106-116. For example, a desktop computer 106 or a laptop computer 112 could have the same or similar structure as that shown in FIG. 2.

FIG. 3 illustrates an example electronic device 300, and the electronic device 300 could represent one or more of the client devices 106-116 in FIG. 1. The electronic device 300 can be a mobile communication device, such as, for example, a mobile station, a subscriber station, a wireless terminal, a desktop computer (similar to the desktop computer 106 of FIG. 1), a portable electronic device (similar to the mobile device 108, the PDA 110, the laptop computer 112, the tablet computer 114, or the HMD 116 of FIG. 1), and the like. In certain embodiments, one or more of the client devices 106-116 of FIG. 1 can include the same or similar configuration as the electronic device 300. In certain embodiments, the electronic device 300 is an encoder, a decoder, or both. For example, the electronic device 300 is usable with data transfer, image or video compression, image or video decompression, encoding, decoding, and media rendering applications.

As shown in FIG. 3, the electronic device 300 includes an antenna 305, a radio-frequency (RF) transceiver 310, transmit (TX) processing circuitry 315, a microphone 320, and receive (RX) processing circuitry 325. The RF transceiver 310 can include, for example, a radio frequency (RF) transceiver, a BLUETOOTH transceiver, a WI-FI transceiver, a ZIGBEE transceiver, an infrared transceiver, and the like. The electronic device 300 also includes a speaker 330, a processor 340, an input/output (I/O) interface (IF) 345, an input 350, a display 355, a memory 360, and a sensor(s) 365. The memory 360 includes an operating system (OS) 361, and one or more applications 362.

The RF transceiver 310 receives, from the antenna 305, an incoming RF signal transmitted from an access point (such as a base station, WI-FI router, or BLUETOOTH device) or other device of the network 102 (such as a WI-FI, BLUETOOTH, cellular, 5G, LTE, LTE-A, WiMAX, or any other type of wireless network). The RF transceiver 310 down-converts the incoming RF signal to generate an intermediate frequency or baseband signal. The intermediate frequency or baseband signal is sent to the RX processing circuitry 325 that generates a processed baseband signal by filtering, decoding, and/or digitizing the baseband or intermediate frequency signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data from the processor 340. The outgoing baseband data can include web data, e-mail, or interactive video game data. The TX processing circuitry 315 encodes, multiplexes, and/or digitizes the outgoing baseband data to generate a processed baseband or intermediate frequency signal. The RF transceiver 310 receives the outgoing processed baseband or intermediate frequency signal from the TX processing circuitry 315 and up-converts the baseband or intermediate frequency signal to an RF signal that is transmitted via the antenna 305.

The processor 340 can include one or more processors or other processing devices. The processor 340 can execute instructions that are stored in the memory 360, such as the OS 361 in order to control the overall operation of the electronic device 300. For example, the processor 340 could control the reception of forward channel signals and the transmission of reverse channel signals by the RF transceiver 310, the RX processing circuitry 325, and the TX processing circuitry 315 in accordance with well-known principles. The processor 340 can include any suitable number(s) and type(s) of processors or other devices in any suitable arrangement. For example, in certain embodiments, the processor 340 includes at least one microprocessor or microcontroller. Example types of processor 340 include microprocessors, microcontrollers, digital signal processors, field programmable gate arrays, application specific integrated circuits, and discrete circuitry.

The processor 340 is also capable of executing other processes and programs resident in the memory 360, such as operations that receive and store data. The processor 340 can move data into or out of the memory 360 as required by an executing process. In certain embodiments, the processor 340 is configured to execute the one or more applications 362 based on the OS 361 or in response to signals received from external source(s) or an operator. Example, applications 362 can include a VR or AR application, camera application (for still images and videos), a video phone call application, an email client, a social media client, a SMS messaging client, a virtual assistant, and the like. In certain embodiments, the processor 340 is configured to receive and transmit media content.

The processor 340 is also coupled to the I/O interface 345 that provides the electronic device 300 with the ability to connect to other devices, such as client devices 106-114. The I/O interface 345 is the communication path between these accessories and the processor 340.

The processor 340 is also coupled to the input 350 and the display 355. The operator of the electronic device 300 can use the input 350 to enter data or inputs into the electronic device 300. The input 350 can be a keyboard, touchscreen, mouse, track ball, voice input, or other device capable of acting as a user interface to allow a user in interact with the electronic device 300. For example, the input 350 can include voice recognition processing, thereby allowing a user to input a voice command. In another example, the input 350 can include a touch panel, a (digital) pen sensor, a key, or an ultrasonic input device. The touch panel can recognize, for example, a touch input in at least one scheme, such as a capacitive scheme, a pressure sensitive scheme, an infrared scheme, or an ultrasonic scheme. The input 350 can be associated with the sensor(s) 365 and/or a camera by providing additional input to the processor 340. In certain embodiments, the sensor 365 includes one or more inertial measurement units (IMUs) (such as accelerometers, gyroscope, and magnetometer), motion sensors, optical sensors, cameras, pressure sensors, heart rate sensors, altimeter, and the like. The input 350 can also include a control circuit. In the capacitive scheme, the input 350 can recognize touch or proximity.

The display 355 can be a liquid crystal display (LCD), light-emitting diode (LED) display, organic LED (OLED), active matrix OLED (AMOLED), or other display capable of rendering text and/or graphics, such as from websites, videos, games, images, and the like. The display 355 can be sized to fit within a HMD. The display 355 can be a singular display screen or multiple display screens capable of creating a stereoscopic display. In certain embodiments, the display 355 is a heads-up display (HUD).

The memory 360 is coupled to the processor 340. Part of the memory 360 could include a RAM, and another part of the memory 360 could include a Flash memory or other ROM. The memory 360 can include persistent storage (not shown) that represents any structure(s) capable of storing and facilitating retrieval of information (such as data, program code, and/or other suitable information). The memory 360 can contain one or more components or devices supporting longer-term storage of data, such as a read only memory, hard drive, Flash memory, or optical disc. The memory 360 also can contain media content. The media content can include various types of media such as images, videos, three-dimensional content, VR content, AR content, and the like.

The electronic device 300 further includes one or more sensors 365 that can meter a physical quantity or detect an activation state of the electronic device 300 and convert metered or detected information into an electrical signal. For example, the sensor 365 can include one or more buttons for touch input, a camera, a gesture sensor, an IMU sensors (such as a gyroscope or gyro sensor and an accelerometer), an eye tracking sensor, an air pressure sensor, a magnetic sensor or magnetometer, a grip sensor, a proximity sensor, a color sensor, a bio-physical sensor, a temperature/humidity sensor, an illumination sensor, an Ultraviolet (UV) sensor, an Electromyography (EMG) sensor, an Electroencephalogram (EEG) sensor, an Electrocardiogram (ECG) sensor, an IR sensor, an ultrasound sensor, an iris sensor, a fingerprint sensor, a color sensor (such as a Red Green Blue (RGB) sensor), and the like. The sensor 365 can further include control circuits for controlling any of the sensors included therein.

As discussed in greater detail below, one or more of these sensor(s) 365 may be used to control a user interface (UI), detect UI inputs, determine the orientation and facing the direction of the user for three-dimensional content display identification, and the like. Any of these sensor(s) 365 may be located within the electronic device 300, within a secondary device operably connected to the electronic device 300, within a headset configured to hold the electronic device 300, or in a singular device where the electronic device 300 includes a headset.

The electronic device 300 can receive an encoded bitstream from another electronic device or via the network 102 of FIG. 1. The electronic device 300 decodes the received bitstream into multiple 2D frames. In certain embodiments, the decoded bitstream also includes an occupancy map. The decoded bitstream can also include one or more flags, or quantization parameter size, or any combination thereof. The multiple 2D frames can include a set of frames that indicate coordinates, such as a geographic location of each point of a point cloud. For example, the frames can include a pictorial depiction, such as one or more patches of each geometric point of the point cloud as represented in 2D. Another set of frames can include texture that is associated with each point, such as the color of each point. The electronic device 300 can then reconstruct and render the point cloud in three dimensions.

Although FIGS. 2 and 3 illustrate examples of electronic devices, various changes can be made to FIGS. 2 and 3. For example, various components in FIGS. 2 and 3 could be combined, further subdivided, or omitted and additional components could be added according to particular needs. As a particular example, the processor 340 could be divided into multiple processors, such as one or more central processing units (CPUs) and one or more graphics processing units (GPUs). In addition, as with computing and communication, electronic devices and servers can come in a wide variety of configurations, and FIGS. 2 and 3 do not limit this disclosure to any particular electronic device or server.

Figure 4A:
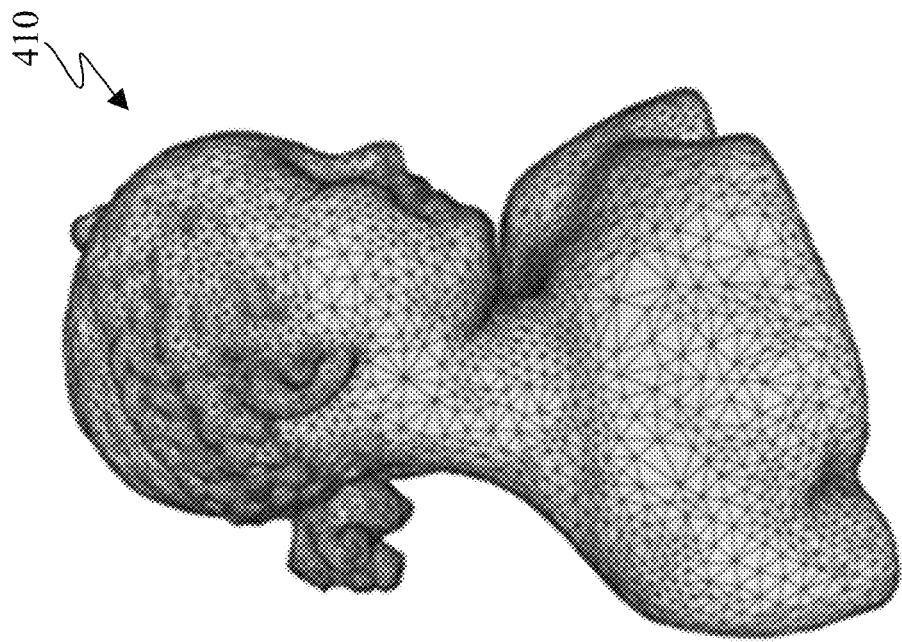
FIG. 4A illustrates an example point cloud and an example mesh in accordance with an embodiment of this disclosure.
Figure 4A:
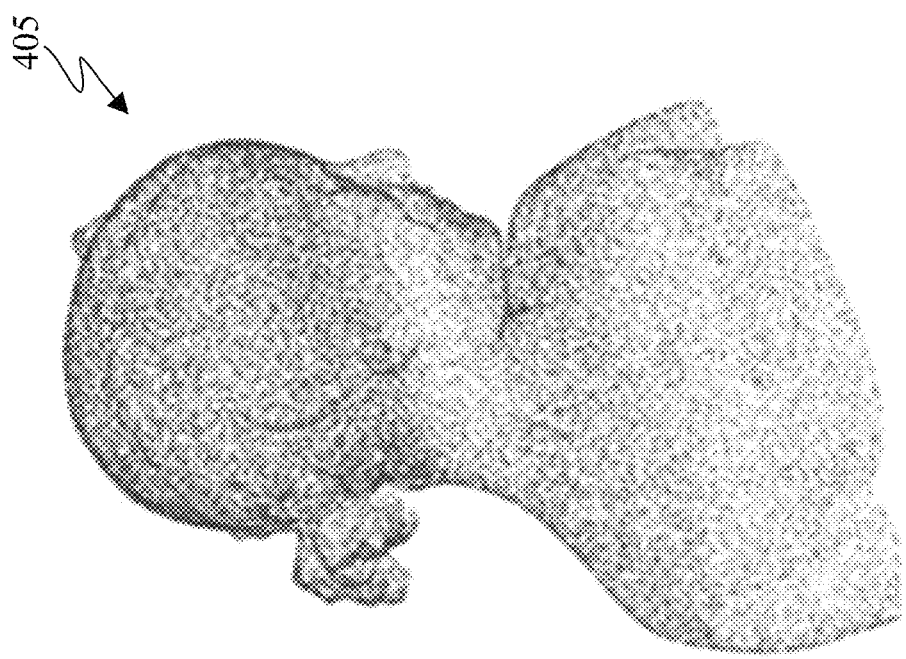
Figure 4D:
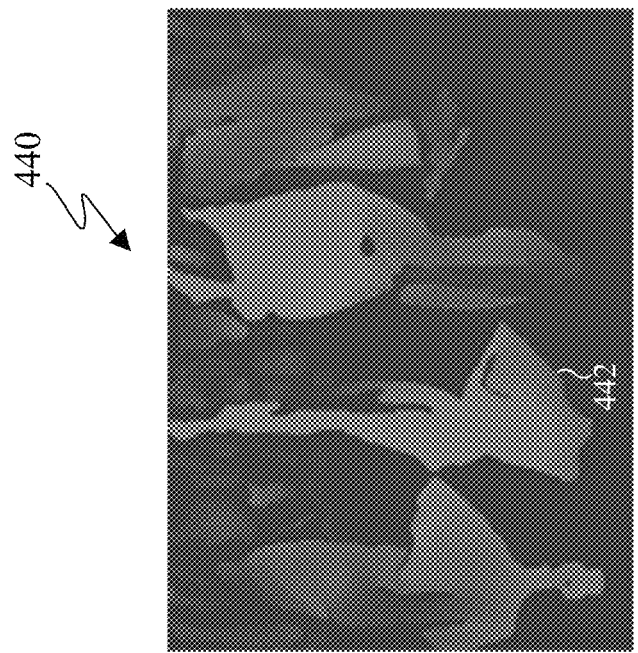
FIGS. 4B, 4C, and 4D illustrate an example 3D point cloud and 2D frames, that represent the 3D point cloud in accordance with an embodiment of this disclosure.
Figure 4C:
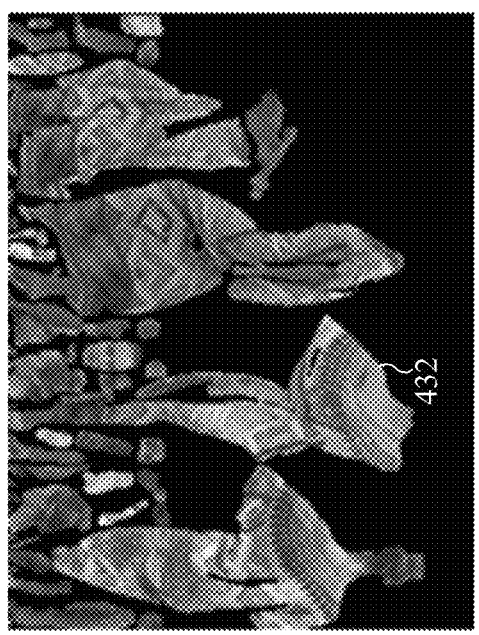
Figure 4B:

FIG. 4A illustrates an example point cloud 405 and an example mesh 410 in accordance with an embodiment of this disclosure. The point cloud 405 depicts an illustration of a point cloud. The point cloud 405 includes multiple points that visually define an object in 3D space. Each point of the point cloud represents an external coordinate of the object, similar to a topographical map. For example, each point can include one or more attributes. The attributes can include geometry, such as a geographical location of each point of the point cloud. The attributes of each point can also include a texture such as color, intensity, motion, material properties, reflectiveness, and the like.

Similarly, the mesh 410 depicts an illustration of a 3D mesh. The mesh 410 illustrates the external structure of an object that is built out of polygons. For example, the mesh 410 is a collection of vertices, edges, and faces that define the shape of an object. The mesh 410 is defined by many polygonal or triangular interconnectivity of information between the various points. Each polygon of the mesh 410 represents the external surface of the object. The vertices of each polygon are similar to the points in the point cloud 405. Each polygon can include information, such as an attribute. The attribute can include geometry and texture. Texture includes color, reflectiveness, motion, and the like. For example, topological data provide connectivity information among vertices such as adjacency of vertices, edges, and faces. Geometrical information provides the geometric location of each vertex in 3D space.

FIGS. 4B, 4C, and 4D illustrate an example 3D point cloud and 2D frames that represent the 3D point cloud in accordance with an embodiment of this disclosure. In particular, FIG. 4B illustrates a 3D point cloud 420, and FIGS. 4C and 4D each illustrate a 2D frame that includes patches. The FIG. 4C illustrates the frame 430 that includes the color associated with each patch of the 3D point cloud 420. The FIG. 4D illustrates the frame 440 that indicates the geometric position of each point of the 3D point cloud 420. The embodiment of FIGS. 4B, 4C, and 4D, are for illustration only and other embodiments could be used without departing from the scope of this disclosure.

The 3D point cloud 420 is similar to the point cloud 405 and the mesh 410 of FIG. 4A. The 3D point cloud 420 is a set of data points in 3D space. Each point of the 3D point cloud includes multiple attributes such as (i) geometric position that provides the structure of the 3D point cloud and (ii) one or more textures that provide information about each point such as color, reflectiveness, material, and the like. In certain embodiments, each frame has a corresponding frame illustrating a different attribute. For example, for a given geometry frame, there are one or more texture frames that indicate various texture attributes for the geometry frame.

FIGS. 4C and 4D illustrate the 2D frames 430 and 440 respectively. The 2D frame 430, depicts multiple patches (such as a patch 432) representing the color of the 3D point cloud 420. The frame 440, depicts multiple patches (such as a patch 442) representing the depth values of the 3D point cloud 420. The location of the patches within the 2D frames 430 and 440 can be similar for a single position of the 3D point cloud. For example, as the 3D point cloud changes, new frames can be generated with different patches based on the new position the 3D point cloud.

Although FIGS. 4A, 4B, 4C, and 4D illustrate example point clouds, point meshes and 2D frames representing a point cloud various changes can be made to FIGS. 4A, 4B, 4C, and 4D. For example, the point cloud and point mesh represent a single object, whereas in other embodiments, a point cloud or point mesh can represent multiple objects, scenery (such as a landscape), AR, and the like. In another example, the patches included in the 2D frames can represent other attributes such as texture, luminance, material, and the like. FIGS. 4A, 4B, 4C, and 4D do not limit this disclosure to any particular 3D object(s) and 2D frames representing the 3D object(s).

Figure 5A:
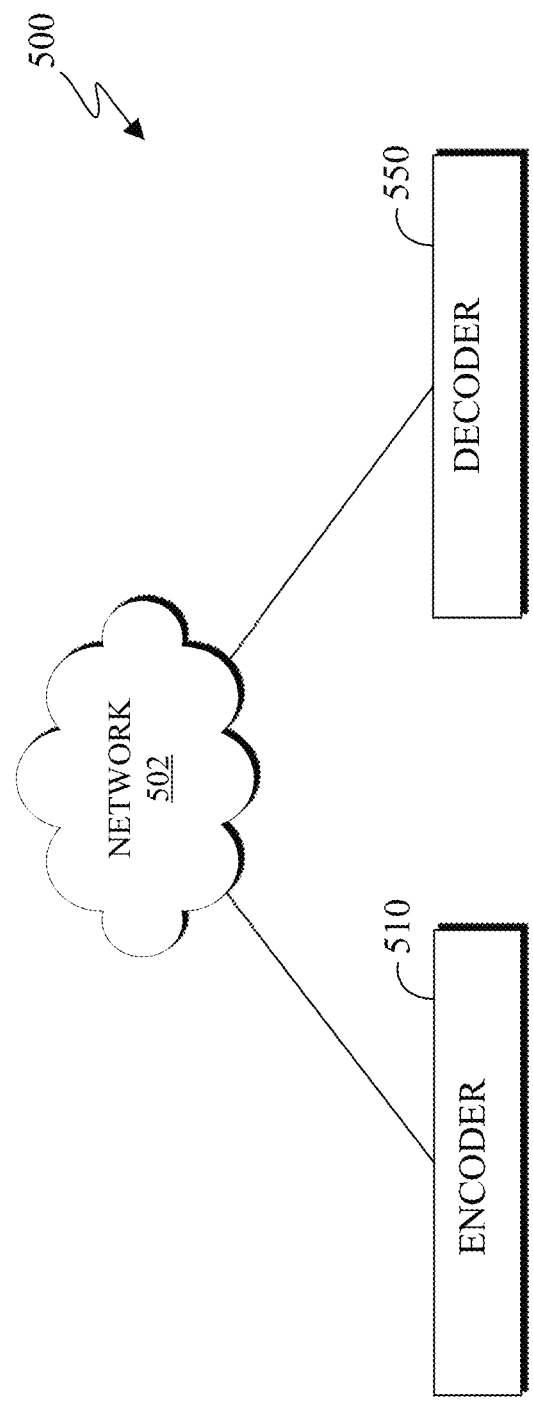
FIG. 5A illustrates a block diagram of an example environment-architecture in accordance with an embodiment of this disclosure.
Figure 5B:
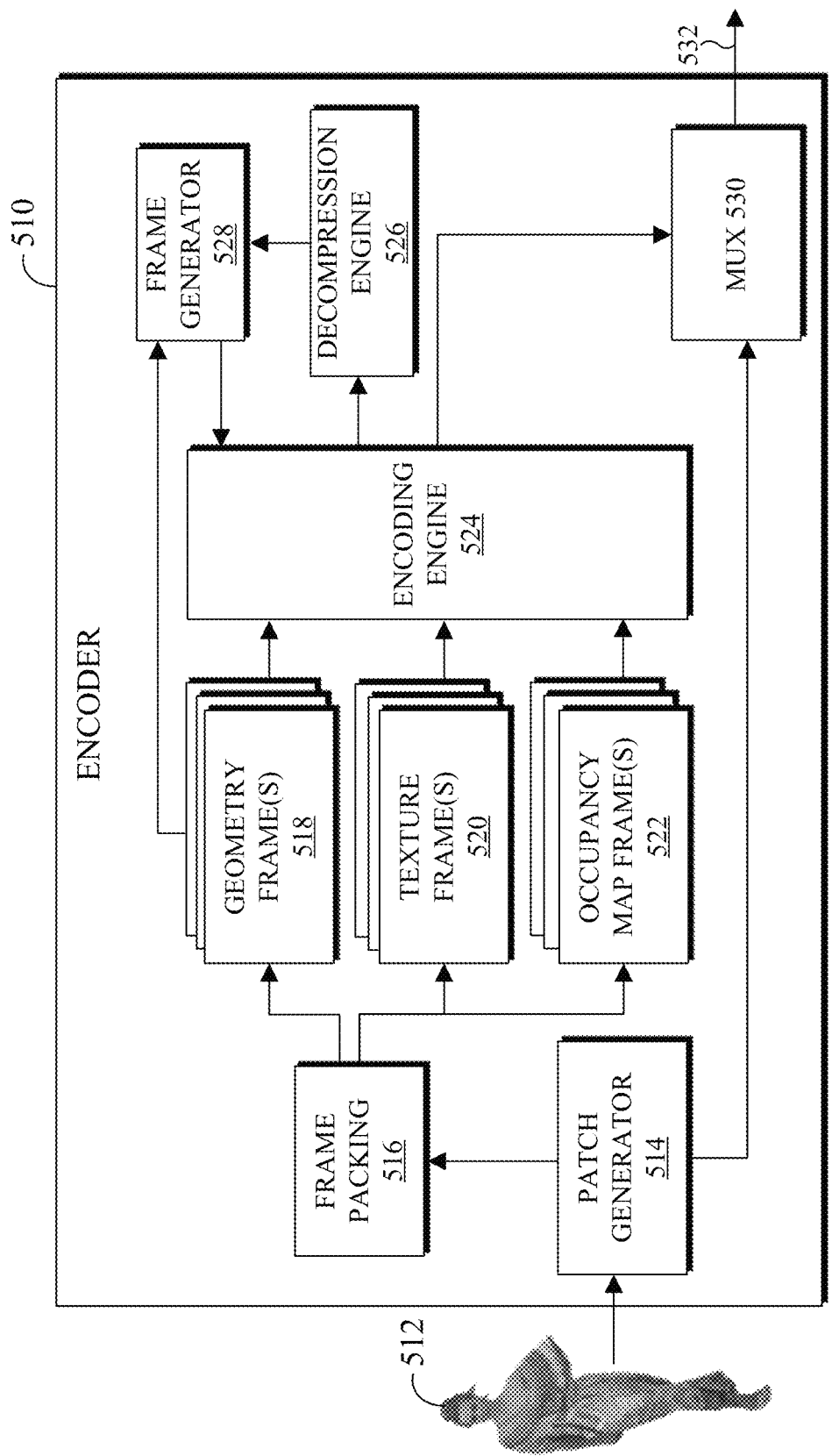
FIG. 5B illustrates an example block diagram of an encoder in accordance with an embodiment of this disclosure.
Figure 5C:
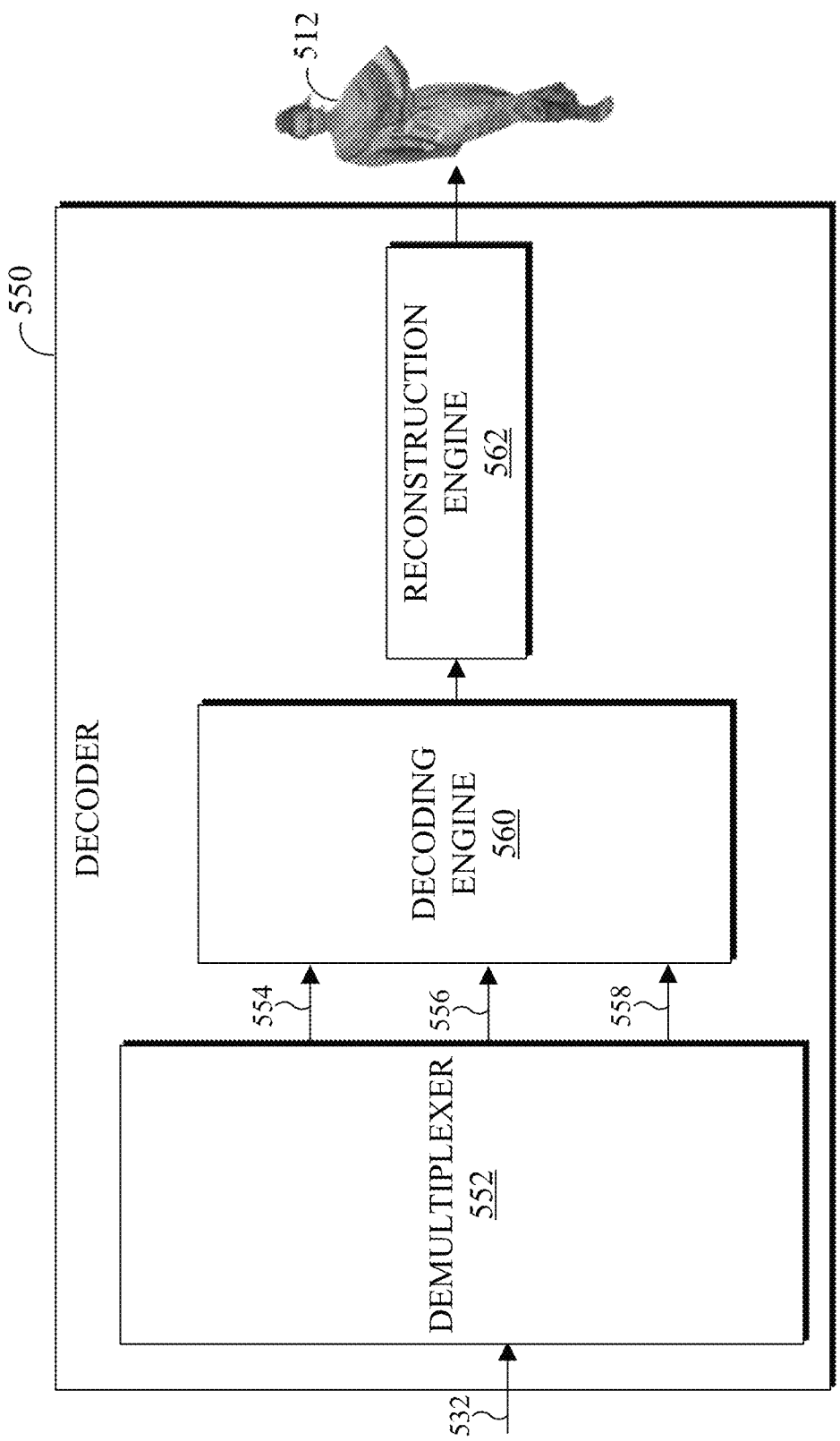
FIG. 5C illustrates an example block diagram of a decoder in accordance with an embodiment of this disclosure.

FIG. 5A illustrates a block diagram of an example environment-architecture 500 in accordance with an embodiment of this disclosure. As shown in FIG. 5A, the environment-architecture 500 includes an encoder 510 and a decoder 550 in communication over a network 502. FIG. 5B illustrates an example block diagram of the encoder 510 of FIG. 5A in accordance with an embodiment of this disclosure. FIG. 5C illustrates an example block diagram of the decoder 550 of FIG. 5A in accordance with an embodiment of this disclosure. The embodiments of FIGS. 5A, 5B, and 5C are for illustration only. Other embodiments can be used without departing from the scope of this disclosure.

The network 502 can be the same as or similar to the network 102 of FIG. 1. In certain embodiments, the network 502 represents a "cloud" of computers interconnected by one or more networks, where the network is a computing system utilizing clustered computers and components that act as a single pool of seamless resources when accessed. Also, in certain embodiments, the network 502 is connected with one or more servers (such as the server 104 of FIG. 1, the server 200, and the encoder 510), one or more electronic devices (such as the client devices 106-116 of FIG. 1, the electronic device 300, the encoder 510, and the decoder 550). Further, in certain embodiments, the network 502 can be connected to an information repository that contains a VR and AR media content that can be rendered and displayed on an electronic device associated with the decoder 550.

In certain embodiments, the encoder 510 and the decoder 550 can represent the server 104, one of the client devices 106-116 of FIG. 1, the server 200 of FIG. 2, the electronic device 300 of FIG. 3, or other suitable device. In other embodiments, a portion of the components included in the encoder 510 or the decoder 550 can be included in different devices, such as multiple servers 104 or 200, multiple client devices 106-116, or other combination of different devices. In certain embodiments, the encoder 510 is operably connected to one electronic device and the decoder 550 is operably connected to another electronic device. In certain embodiments, the encoder 510 and the decoder 550 are the same device or operably connected to the same device.

In this example, the encoder 510 can be included in a server, such the servers 104 or 200. The encoder 510 is described with more below in FIG. 5B. In certain embodiments, encoder 510 is a web server, a server computer such as a management server, or any other electronic computing system capable of, mapping the three dimensions of a point cloud into two dimensions, packing the patches representing the 3D point cloud onto 2D frames, compressing frames, and encoding images for transmission. In certain embodiments, the encoder 510 can be a "cloud" of computers interconnected by one or more networks, where each is a computing system utilizing clustered computers and components to act as a single pool of seamless resources when accessed through the network 502

The encoder 510 can receive 3D media content, such as a point cloud, from another device such as a server (similar to the server 104 of FIG. 1, the server 200 of FIG. 2) or an information repository (such as a database). In certain embodiments, the encoder 510 can receive media content from multiple cameras and stitch the content together to generate a 3D scene. The encoder 510 compresses, encodes, and transmits a point cloud (or a mesh) as an encoded bitstream.

The encoder 510 can project a 3D point cloud (such as the 3D point cloud 420 of FIG. 4B) into multiple patches (such as the patches 432 and 442 of FIGS. 4C and 4D, respectively) and pack the patches onto frames (such as the frames 430 and 440 of FIGS. 4C and 4D, respectively). The encoder 510 also generates a bitstream that represents the 3D media content based on the 2D frames. The bitstream can be transmitted to an information repository (such as a database) or a decoder (such as the decoder 550) through the network 502.

In certain embodiments, the encoder 510 generates multiple 2D frames in which a point cloud or a mesh is mapped or projected onto. In other embodiments, the encoder 510 unwraps the point cloud and then maps it onto multiple 2D frames. For example, the point cloud can be unwrapped along one axis (such as the Y-axis), and the image is mapped along the remaining axis (such as X and Z axis). In another example, a cluster of points of the 3D point cloud can be projected onto a 2D frame. For instance, the geometric coordinate Z of a point of the 3D point cloud is projected at an X and Y coordinates of the 2D frame, where the X and Y coordinate of the 2D frame correspond to the X and Y coordinate of the point of the 3D point cloud.

The encoder 510 clusters pixels of a point cloud (such as the 3D point cloud 420 of FIG. 4B) into groups which are projected onto XY, YZ, and XZ planes. The projected clusters are similar to the patches 432 of FIG. 4C. The projected clusters are packed into 2D frames (similar to frames 430 and 440 of FIGS. 4C and 4D, respectively) for encoding. The encoder then generates a bitstream that includes the encoded and compressed 2D frames. The bitstream can then be transmitted to another device such as an information repository or a decoder, such as the decoder 550.

The decoder 550 can receive a bitstream that represents 3D media content, such as a point cloud, a mesh, or both. The bitstream can include multiple 2D frames representing a 3D point cloud. The decoder 550 can decode the bitstream and generate a 3D point cloud from multiple 2D frames included in the bitstream. In this example, the decoder 550 can be included in any of the client devices 106-116, such as the HMD 116. The decoder 550 is described with more below in FIG. 5C.

FIG. 5B illustrates the encoder 510 which receives a 3D point cloud 512 and generates a compressed bitstream 532. The encoder 510 includes a patch generator 514, a frame packing 516, various frames (such as one or more geometry frames 518, one or more texture frames 520, and one or more occupancy map frames 522), an encoding engine 524, a decompression engine 526, a frame generator 528, and a multiplexer 530. The 3D point cloud 512 represents the input into the encoder 510 and can be similar to the point cloud 405, the mesh 410, and the 3D point cloud 420. The 3D point cloud 512 can be stored in memory (not shown) or received from another electronic device (not shown). The 3D point cloud 512 can be a single 3D object, scenery, video content, and the like. The encoder 510 generates a compressed bitstream 532 which can be transmitted to the network 502 of FIG. 5A.

The patch generator 514 decomposes the 3D point cloud 512 and creates multiple patches, such as the patches 432 of 442 of FIGS. 4C and 4D. The patches can be organized by an attribute, such as geometry, texture, reflectiveness, material, and the like. Geometry (such as the geometry frames 518 and the frame 440 of FIG. 4D) represent is the geographic location of each point of the 3D point cloud 512. Texture (such as the texture frames 520 and the frame 430 of FIG. 4C) represents a single aspect of each point of the 3D point cloud 512, such as color. Each geometry frame 518 has at least one corresponding texture frame 520, such that each corresponding texture frame 520 corresponds to an attribute of the geometry frame such as color. In certain embodiments, additional frames can be created that represent the other attributes. The patch generator 514 generates patches by projecting a 3D point cloud onto a 2D surface. For example, the patch generator 514 can generate multiple frames of the same 3D point cloud using two or more projection planes. In certain embodiments. The patch generator splits geometry aspects of each point of a point cloud and texture components of each point of a point cloud, to be stored on respective geometry frames 518 or the texture frames 520.

The frame packing 516 sorts and packs the patches (both the geometry and texture patches) into frames, such as the geometry frames 518 and the texture frames 520. In certain embodiments, frame packing 516 generates one or more occupancy map frames 522 based on the placement of the patches within the geometry frames 518 and the texture frames 520. In certain embodiments, the frame packing 516 groups similar attributes within the same frame. For example, the geometry frames 518 includes patches of points that represent the geometry of the 3D point cloud 512, whereas the texture frames 520 include patches of points that represent the texture of the 3D point cloud 512.

The occupancy map frames 522 represent occupancy maps that indicate the valid pixel locations in the frames (such as the geometry frames 518 and the texture frames 520). The valid pixels are the actual points of the 3D point cloud 512 which are projected into patches (via the patch generator 514) and packed into respective frames (via the frame packing 516). For example, the occupancy map frames 522 indicate whether a point in a frame is a valid pixel or an invalid pixel. A valid point on the occupancy map indicates a pixel on the 2D frame that corresponds to a 3D point in the point cloud. If the occupancy map indicates that a point is an invalid pixel, then that the pixel does not correspond to a point of the 3D point cloud 512. The invalid points are locations of the frame that does not correspond to a point of the point cloud. In certain embodiments, one of the occupancy map frames 522 can correspond to the both a geometry frame 518 and a texture frames 520.

In certain embodiments, the geometry frames 518 and the texture frames 520 can each represent groupings of projections of the 3D point cloud. For example, a projection of the 3D point cloud can be made at different depths. For instance, two or more geometry frames can include projections at different depths. In some embodiments, two depth images are generated for each input point cloud frame. A first depth image can be denoted as $D_0$ and a second depth image can be denoted as $D_1$. It should be noted, that other notations can be used. In other embodiments, more than two depth images are generated for each input point cloud frame. Regardless of the number of depth images that are generated for an input point cloud frame, each image is separated from the previous frame or a subsequent frame by a surface thickness. The surface thickness indicates the difference between two corresponding depth images. Texture frames 520 can also include corresponding texture attributes for the different depth projection images.

The geometry frames 518, the texture frames 520, and the occupancy map frames 522 are encoded via the encoding engine 524. In certain embodiments, multiple encoding engines can encode the sets of frames separately. For example, one encoding engine can encode the geometry frames 518, another encoding engine can encode the texture frames 520, and yet another encoding engine can encode the occupancy map frames 522. In certain embodiments, the encoding engine 524 can be configured to support an 8-bit, a 10-bit, a 12-bit, a 14-bit, or a 16-bit, precision of data. The encoding engine 524 can be a video or image codec such as HEVC, AVC, VP9, VP8, JVNET, and the like to compress the 2D frames representing the 3D point cloud.

In certain embodiments, after the encoding engine 524 encodes and compresses the geometry frames 518, the texture frames 520, and the decompression engine 526 can decompress one or more frames. In certain embodiments, the decompression engine 526 decompresses select frames while not affecting other frames. For example, the decompression engine 526 can decompress only frames that are associated with a certain depth image, such as $D_0$.

Figure 6A:
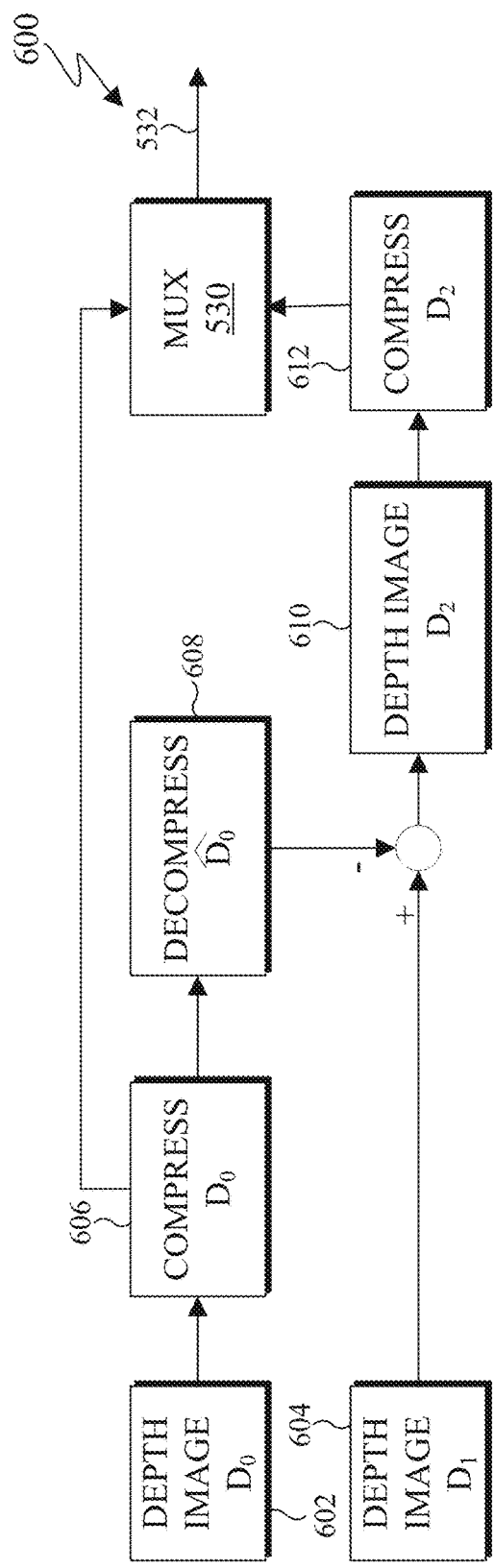
FIG. 6A illustrates an example process of creating a compressed bitstream from two geometry frames in accordance with an embodiment of this disclosure.

After the decompression engine 526 decompresses a frame, such as the depth frame $D_0$, the frame generator 528 can create a differential between the depth frame $D_0$ and a frame that corresponds to a different depth, such $D_1$. For example, if two depth images are generated, $D_0$ and $D_1$ instead of compressing both images separately, the frame generator 528 takes the difference between the frames $D_0$ (which was compressed by the encoding engine 524 then decompressed by the decompression engine 526) and $D_1$, to generate a new frame $D_2$. Thereafter, the encoding engine 524 then encodes the difference frame, $D_2$. FIG. 6A, below further describes the process of creating and encoding $D_0$, $D_1$, and $D_2$.

The multiplexer 530 combines the encoded frames to create a single bitstream 532. The multiplexer 530 is also able to combine the parameters that instruct the decoder 550 as different quantization parameters.

FIG. 5C illustrates the decoder 550 that includes a demultiplexer 552, a decoding engine 560, and a reconstruction engine 562. The decoder 550 receives the compressed bitstream 532 that originated from the encoder 510. The demultiplexer 552 separates various streams of data from the bitstream 532. For example, the demultiplexer 552 separates various streams of data such as the geometry frame information 554 (originally the geometry frames 518 of FIG. 5B), texture frame information 556 (originally the texture frames 520 of FIG. 5B), and the occupancy map information 558 (originally the occupancy map frames 522 of FIG. 5B).

The bitstream of the geometry frame information 554, the bitstream of the texture frame information 556, and the bitstream of the occupancy map information 558 are decoded, via the decoding engine 560, to generate the 2D video frames representing the geometry and texture of the 3D point cloud as well as the and occupancy map frames. In certain embodiments, separate, parallel decoding engines similar to the decoding engine 560, can process each received bitstream.

The reconstruction engine 562 reconstructs the 3D point cloud by reconstructing decoded geometry frames, the decoded texture frames, and the occupancy map frames. For example, the reconstruction engine 562 reconstructs the depth image $D_1$, based on the differential depth image $D_2$ and the depth image $D_0$. The reconstruction engine 562 can identify the quantization parameter that is included as metadata in the bitstream 532.

Although FIG. 5A illustrate the environment-architecture 500, FIG. 5B illustrates the encoder 510, and FIG. 5C illustrates the decoder 550 various changes can be made to FIGS. 5A, 5B, and 5C. For example, any number of encoders or decoders can be included environment-architecture 500.

Figure 6B:
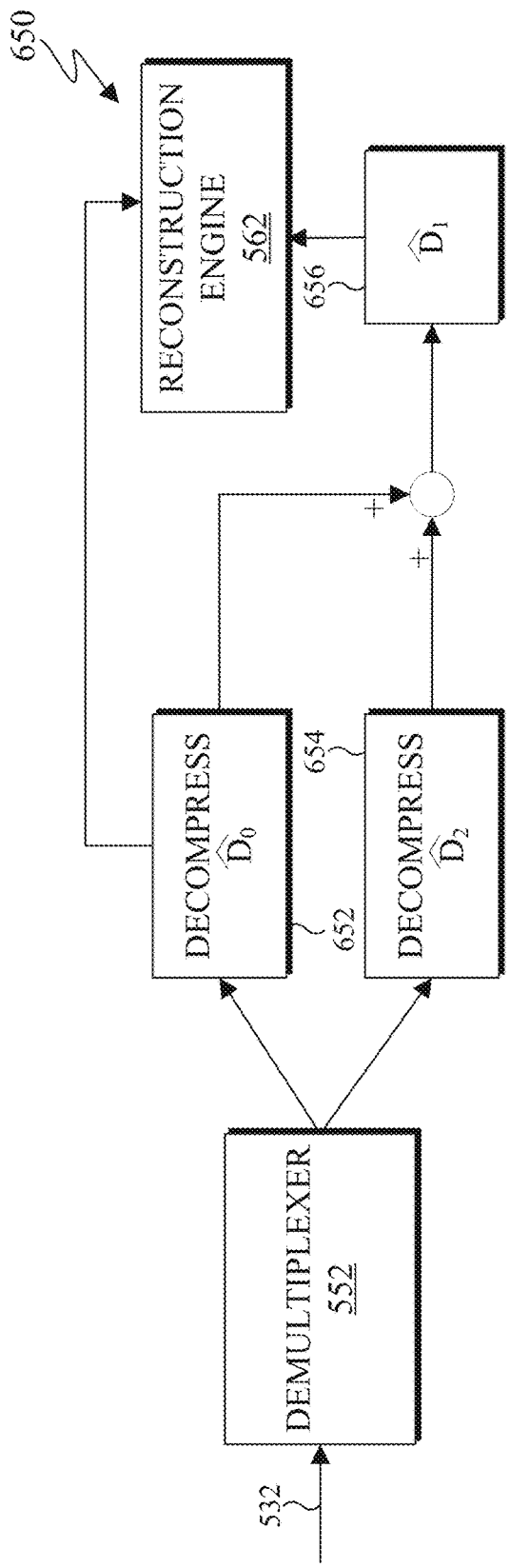
FIG. 6B illustrates an example process of reconstructing the point cloud from two geometry frames in accordance with an embodiment of this disclosure.

FIGS. 6A and 6B illustrate the process of generating the differential depth image $D_2$ (from depth images $D_0$ and $D_1$), transmitting the depth images $D_0$ and $D_2$ as a bitstream, and then reconstructing the depth image $D_1$ from the received bitstream to reconstruct the 3D point cloud in accordance with an embodiment of this disclosure. In particular, FIG. 6A illustrates an example process 600 of creating a compressed bitstream from two frames in accordance with an embodiment of this disclosure. In certain embodiments, some or all of the process 600 is included in the encoder 510 of FIGS. 5A and 5B. FIG. 6B illustrates an example process 650 of reconstructing the point cloud from two frames in accordance with an embodiment of this disclosure. In certain embodiments, some or all of the process 650 is included in the decoder 550 of FIGS. 5A and 5C.

In certain embodiments, a geometry frame, such as a geometry frame 518 of FIG. 5B, represents two depth images (denoted as $D_0$ and $D_1$). In other embodiments, a geometry frame represents more than two depth images. A texture frame (such as the texture frame 520 of FIG. 5B) corresponding to a certain geometry frame (such as the geometry frame 518 of FIG. 5B), represents a number of texture images that correspond respectively to the number of depth images represented by the certain geometry frame. Regardless of the number of depth images, at least two depth images are taken at different projection planes of the 3D point cloud. For example, a first depth image is taken at or near the projection plane, and another depth image is taken a distance further from the projection plane. In certain embodiments, additional depth images can be created by using depths greater than the second depth image. Depth images are related by a surface thickness which indicates the maximum difference between depth values of the depth images. If two depth images are generated for a 3D point cloud frame, the depth images are related based on equation (1) below.

$$D_0(r,c) \leq D_1(r,c) \leq (D_0(r,c) + \text{surfaceThickness}) \quad (1)$$

The depth image $D_0$ is represented by the expression $D_0(r,c)$ and $D_1$ is represented by the expression $D_1(r,c)$, where 'r' indicates the number or rows and 'c' indicates the number of columns. Both 'r' and 'c' can represent different numbers that are equal to or greater than zero. Equation (1) depicts that the depth image $D_1$ is greater than or equal to the depth image $D_0$, such that points can be on the closer plane of projection. Similarly, the depth image $D_1$ is less than or equal to the depth image $D_0$ plus a surface thickness. The surface thickness indicates the maximum distance between the corresponding depth values in depth image $D_1$ and depth image $D_0$. In certain embodiments, the surface thickness of four is default. If the 3D point cloud is thick then a surface thickness greater than four is used, such that the depth values from depth image $D_1$ may be significantly greater than the corresponding depth values from depth image $D_0$. In contrast, if the 3D point cloud is thin, then a surface thickness that is less than four is used, such that the corresponding depth values for depth image $D_1$ and depth image $D_0$ are close to each other. In certain embodiments, the surface thickness does not change from one frame to a subsequent frame. In other embodiments, the surface thickness can change from one frame to a subsequent frame.

In certain embodiments, 'r' and 'c' are not the actual XY, YZ, or XZ coordinates that are projected from the 3D point cloud onto the frame. Rather 'r' and 'c' can be offset from its original projection coordinates in order to fit multiple patches onto a single frame via the frame packing 516 of FIG. 5B.

Significant bandwidth can be used when compressing and transmitting multiple depth images, such as the depth images $D_1$ and $D_0$. Therefore, a difference image, denoted as $D_2$, can be generated when compressing and transmitting the multiple depth images, such as the depth images $D_1$ and $D_0$ via the encoder 510 of FIGS. 5A and 5B. The difference image $D_2$, as illustrated in Equation (2) below, represents the difference between the depth images $D_0$ and $D_1$. For example, instead of transmitting both depth images $D_0$ and $D_1$, the difference image $D_2$ (which is the difference between both depth images $D_0$ and $D_1$) is transmitted in addition to one of the other depth images $D_0$ and $D_1$. However, the error associated with the depth image $D_1$ increases, when reconstructing the depth image $D_1$ (at the decoder such as the decoder 550 of FIGS. 5A and 5C) from both of the transmitted depth images (such as the depth images $D_0$ and $D_2$). The error can degrade the quality of the reconstructed 3D point cloud. The error associated with the depth image $D_1$ represents the individual errors due to the compression and later decompression of the transmitted depth images (such as the depth images $D_0$ and $D_2$), which are later used when reconstructing the depth image $D_1$. The error associated with the depth image $D_1$ represents the individual errors from the transmitted depth images (such as the depth images $D_0$ and $D_2$). Therefore, Equation (4), illustrated below, reduces the magnitude of the error associated with the depth image $D_1$ when improving the efficiency of compressing and transmitting the multiple depth images. Equation (2) below illustrates generating the depth image $D_2$, which represents the difference between the depth images $D_0$ and $D_1$.

$$D_2(r,c) = D_1(r,c) - D_0(r,c) \quad (2)$$

The difference image denoted as depth image $D_2$ is smaller in size than the depth image $D_1$. As such, the depth images depth images $D_0$ and $D_2$ can be compressed and transmitted from the encoder (such as the encoder 510) to the decoder (such as the decoder 550) to increase compression efficiency. The decoder decodes the depth images $D_0$ and $D_2$, and then reconstructs the depth image $D_1$ by adding the decoded depth images $D_0$ to the decoded depth images $D_2$. Equation (3) below illustrates the reconstruction of the depth image $D_1$ from the decompressed depth images $D_0$ and $D_2$.

$$\hat{D}_1(r,c) = \hat{D}_0(r,c) + \hat{D}_2(r,c) \qquad (3)$$

The depth images $\hat{D}_0$ and $\hat{D}_2$ represent the compressed and then decompressed depth images $D_0$ and $D_2$, respectively. Similarly, the depth image $\hat{D}_1$ represent the reconstructed depth image $D_1$ from the compressed and then decompressed depth images $\hat{D}_0$ and $\hat{D}_2$.

When the decoder, decodes the depth images $\hat{D}_0$ and $\hat{D}_2$ (originally $D_0$ and $D_2$), and then reconstructs the depth image $\hat{D}_1$ (originally $D_1$), errors due to the compression and then decompression of the depth image $D_0$ and errors due to the compression and then decompression of the depth image $D_2$ are compounded which can causes a larger quantization errors in the reconstructed depth image $D_1$. The increase in the quantization error of the reconstructed depth image $D_1$ (due to the individual errors of decompressing both the depth image $\hat{D}_0$ and $\hat{D}_2$) yields performance degradation due to quantization errors of both the depth images $D_0$ and $D_2$. The large quantization error of the depth image $\hat{D}_1$ is due in part to the individual quantization errors in both the depth images $\hat{D}_0$ and $\hat{D}_2$.

Referring to FIG. 6A, depth image 602 corresponding to $D_0$ and the depth image 604 corresponding to $D_1$ are generated for a single frame. An encoding engine (similar to the encoding engine 524 of FIG. 5B) compresses the depth image $D_0$ at step 606. Thereafter, a decompression engine (similar to the decompression engine 526 of FIG. 5B) decompresses the depth image $D_0$ at step 608, thereby creating the depth image $\hat{D}_0$. To reduce the large quantization error of the depth image $\hat{D}_1$, the encoder 510 compresses (via step 606) and then decompresses (via step 608) one of the depth images, such as $D_0$, yielding $\hat{D}_0$. Thereafter, the encoder 510 generates a third depth image, via step 610, such as the depth image $D_2$ by taking the difference of the depth image $D_1$ and the depth image the $\hat{D}_0$, as shown in Equation (4) below.

$$D_2(r,c) = D_1(r,c) - \hat{D}_0(r,c) \qquad (4)$$

Since the depth image $\hat{D}_0$ is compressed and decompressed at the encoder, any quantization errors associated with the depth image $D_2$ due to the depth image $D_0$ are reduced, as the depth image $D_2$ is generated based on the depth image $\hat{D}_0$ rather than on the depth image $D_0$. An encoding engine (similar to the encoding engine 524 of FIG. 5B) compresses the depth image $D_2$ at step 612. After compressing and encoding the depth image $D_2$ (at step 612) and the depth image $D_0$ (at step 606), the encoder 510 generates a bitstream 532 that includes encoded first frame $D_0$, and the encoded third frame $D_2$, via the multiplexer 530.

In certain embodiments, $D_2$ can be modified by clipping the range of $D_2$ between zero and the surface thickness. In certain embodiments, $D_2$ can be further modified by clipping the range of $D_2$ between zero and a high threshold. The high threshold can be greater than or equal to the surface thickness but less than the value of 256. In certain embodiments, a dilation process can be applied to $D_2$. That is, when differential depth image $D_2$ is formed, for pixels for which occupancy map is zero, the depth value is also assigned a value of zero. The process of dilation may be used to assign non-zero values to the pixels that are not occupied so that the high frequencies are reduced, thereby making depth image $D_2$ better suited for compression.

Referring to FIG. 6B, a decoder, such as the decoder 550, receives the bitstream 532. The demultiplexer 552 demultiplexes the bitstream 532 and then decodes and decompresses the depth image $\hat{D}_0$, in step 652 and decodes and decompresses the depth image $\hat{D}_2$, in step 654. Thereafter, the decoder 550 reconstructs the first depth image, $\hat{D}_1$ (step 656) by adding the depth images $\hat{D}_0$ and $\hat{D}_2$ together, as shown in Equation (3) above. The depth image $\hat{D}_1$ does not include quantization errors of both the depth images $\hat{D}_0$ and $\hat{D}_2$ since the depth image $\hat{D}_2$ is based on the compressed and decoded the depth image $\hat{D}_0$. Prior to generating the depth image $\hat{D}_2$, the step 610 took into account any quantization errors of the depth image $\hat{D}_0$ as it was previously compressed and decompressed. At step 656, when reconstructing the depth image $\hat{D}_1$ the quantization errors associated with $\hat{D}_2$ can be associated with the depth image $\hat{D}_1$ while the quantization errors associated with both $\hat{D}_1$ and $\hat{D}_2$ are not associated with the depth image $\hat{D}_1$. After reconstructing $\hat{D}_1$, the reconstruction engine 562 reconstructs the 3D point cloud using the depth images $\hat{D}_1$ and $\hat{D}_0$. In certain embodiments, the depth image $\hat{D}_2$ can be modified by clipping the range of $\hat{D}_2$. between zero and the surface thickness, prior to calculating $\hat{D}_1$.

In certain embodiments, if more than two depth image layers are used to define a 3D point cloud, then Equation (5) is used to relate the multiple depth images.

$$D_k(r,c) - \hat{D}_n(r,c) \qquad (5)$$

In Equation (5), above, $D_k$ refers to a depth image corresponding to layer k, where k is greater than zero and $D_n$ refers to a depth image corresponding to layer n, where n<k. When the differential depth image generated by Equation (5) is compressed by an encoder (such as the encoder 510) and decompressed by a decoder (such as the decoder 550), the reconstructed value is added to $\hat{D}_n(r,c)$ to obtain the reconstructed value for the current depth image $\hat{D}_k(r,c)$.

Although FIGS. 6A and 6B illustrate processes associated with encoder 510 and the decoder 550, various changes can be made to FIGS. 6A and 6B. For example, any number of depth images can be generated.

Figure 7:
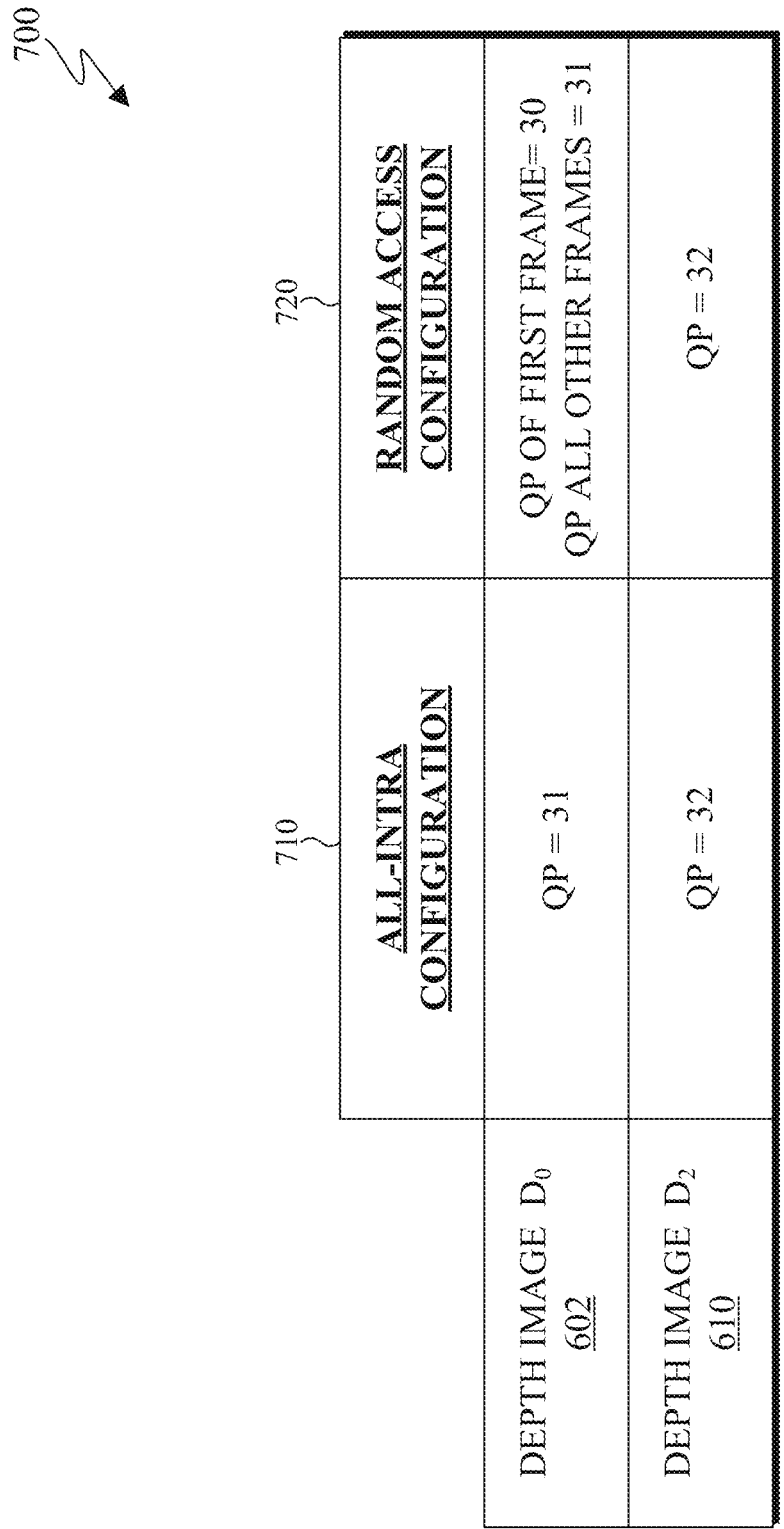
FIG. 7 illustrates a table for quantization parameters based on different configurations in accordance with an embodiment of this disclosure.

FIG. 7 illustrates a table 700 for quantization parameters based on different configurations in accordance with an embodiment of this disclosure. A higher quantization parameter corresponds to higher quantizer step-size and correspondingly higher quantization error (or lower quality). The table 700 depicts different configurations for adjusting quantization parameter to increase the quality of the reconstructed depth images. Other embodiments can be used without departing from the scope of this disclosure.

Since the differential depth image $D_2$ is based on the difference between depth image $D_1$ and reconstructed depth image $\hat{D}_0$, a smaller quantization parameter for $D_0$ leads to smaller quantization error in $D_0$ and hence smaller values in the differential depth image $D_2$. This makes it more suitable for compression, thereby leading to smaller bit-rate. In certain embodiments, quantization parameters as shown in table 700 are applied to the depth images $D_0$ and $D_2$.

The encoder 510 uses a quantization parameter for a specific frame in $D_2$ that is at least one higher than the corresponding frame in $D_0$. The encoder 510 then notifies the decoder 550 of the quantization parameter sizes that were used for the respective frames. In certain embodiments, the quantization parameter sizes can be included or indicated within the bitstream. In certain embodiments, a flag indicating that different quantization parameters are used is included in the bitstream.

In certain embodiments, the quantization parameters sizes change based on the type of configuration. For example, all-intra configuration 710 represents a compression where each frame or image is encoded independently. For example, a compression engine (such as the encoding engine 524 of FIG. 5B) compresses each frame independently without using any information from any other frame. Using a smaller quantization parameter for the depth frame image $D_0$ than the depth frame image $D_2$, yields a higher quality for $D_0$ than $D_2$. The table 700 illustrates a quantization parameters size of 31 for the depth image $D_0$ and a quantization parameters size of 32 for the depth image $D_2$. In certain embodiments, other quantization parameter sizes can be used when compressing and encoding depth images. For example, a quantization parameter of 30 can be used for the depth image $D_0$ while a quantization parameter of 32 can be used for the depth image $D_2$.

In another example, random access configuration 720 represents a compression that includes motion prediction. For example, random access configuration 720 can predict areas of a current frame using similar areas of from a frame that was previously coded. In certain embodiments, a different quantization parameter is used for the first $D_0$ frame than the remainder of the $D_0$ frames. A smaller quantization parameter can be used for the first $D_0$ than the remainder of the $D_0$ frames. This is because the first $D_0$ frame, which lacks a previous frame to predict from, is of a higher quality than subsequent $D_0$ frames which can use the previous depth image $D_0$ to predict from. The table 700 shows a quantization parameter of 30 for the first $D_0$ frame and a quantization parameter of 31 for the reminder of the $D_0$ frames, although if hierarchical coding is used, the quantization parameter increased by different offsets from quantization parameter of 31, based on the level of the hierarchy. In certain embodiments, a lower quantization parameter is used for $D_0$ than for $D_2$, since the $D_2$ frame is generated based on the reconstructed $D_0$ frame. For example, if quantization parameter of 30 for the first $D_0$ frame and a quantization parameter of 31 for the reminder of the $D_0$ frames, then a quantization parameter of 32 can be used for all of the $D_2$ frames. As before, if hierarchical coding is used, the quantization parameter quantization parameter for $D_2$ frames is increased by different offsets from quantization parameter of 32, based on the level of the hierarchy.

The quantization parameters that are used for coding and decoding the depth image frames can be based on the Syntax (1) below. For example, when the parameter 'absolute_d1_coding' is included in the bitstream and set to zero, then using a higher quantization parameter is implemented at the encoder 510 and decoder 550.

```
Syntax                                                       (1)
    Group_of_frames_geometry_video_stream( ) {
        if (absolute_d1_coding {)
            geometry_stream_size_in_bytes
            group_of_frames_geometry_video_payload( )
            ByteCount + = geometry_stream_size_in_bytes
        } elese {
            Geometry_d0_stream_size_in_bytes
            group_of_frames_geometry_d0_video_payload( )
            ByteCount + = geometry_d0_stream_size_in_bytes
            Geometry_d1_stream_size_in_bytes
            group_of_frames_geometry_d1_video_payload( )
            ByteCount + = geometry_d1_stream_size_in_bytes
        }
    }
```

Syntax (1) describes when to use different quantization parameters at the encoder 510. The parameter 'Geometry_d0_stream_size_in_bytes' indicates the size, in bytes, of the geometry $D_0$ frame when 'absolute_d1_coding' is set to zero. The parameter 'Geometry_d1_stream_size_in_bytes' indicates the size, in bytes, of the geometry $D_1$ frame when 'absolute_d1_coding' is set to zero. The decoder 550 detects whether 'absolute_d1_coding' is set to zero. When the parameter 'absolute_d1_coding' is set to zero, the decoder 550 modifies the decoded geometry frame based on Equation (6) below.

$$gFrame[1][c][x][y]=\text{clip3}(0,255,(gFrame[1][c][x][y]+gFrame[0][c][x][y])) \quad (6)$$

Equation (6) indicates that the reconstructed geometry layer that is associated with index one is modified by adding to that frame to the reconstructed geometry layer that is associated with index zero.

Although FIG. 7 illustrates certain quantization parameter for all-intra configuration 710 and random access configuration 720, various changes can be made to FIG. 7. For example, different quantization parameters can be used when encoding and decoding the depth images $D_0$ and $D_2$.

FIGS. 8A, 8B, and 8C illustrate simulation results in accordance with an embodiment of this disclosure. FIG. 8A illustrates an example simulation associated with FIGS. 6A and 6B. For example, FIG. 8A depicts the improvement when compressing and decompressing the depth image $D_0$ prior to creating the depth image $D_2$. For example, when reconstructing the $D_1$ at the decoder (such as the decoder 550) the 19% more efficient than without compressing and decompressing the depth image $D_0$ prior to creating the depth image $D_2$. Additionally the reduced quantization error associated with $D_1$, yields an improvement for the $D_2$ frame as well as texture frames such as color.

FIG. 8B illustrates an example simulation associated with the all-intra configuration 710 of FIG. 7. For example, when using the quantization parameter step sizes of 31 for the depth image $D_0$ and the quantization parameter step sizes of 32 for the depth image $D_2$, when reconstructing the $D_1$ at the decoder (such as the decoder 550) is 25.7% more efficient with less quantization errors. Additionally the reduced quantization error associated with $D_1$, yields an improvement for the $D_2$ frame as well as texture frames such as color.

Similarly, FIG. 8C illustrates an example simulation associated with the random access configuration 720 of FIG. 7. For example, when using a quantization parameter step sizes of 30 for the first depth image frame $D_0$ and a quantization parameter step sizes of 31 for the remainder of the depth image $D_0$ frames, as well as a quantization parameter step sizes of 32 for the depth image $D_2$, when reconstructing the $D_1$ at the decoder (such as the decoder 550) is 26.7% more efficient with less quantization errors. Additionally the reduced quantization error associated with $D_1$, yields an improvement for the $D_2$ frame as well as texture frames such as color.

Figure 9A:
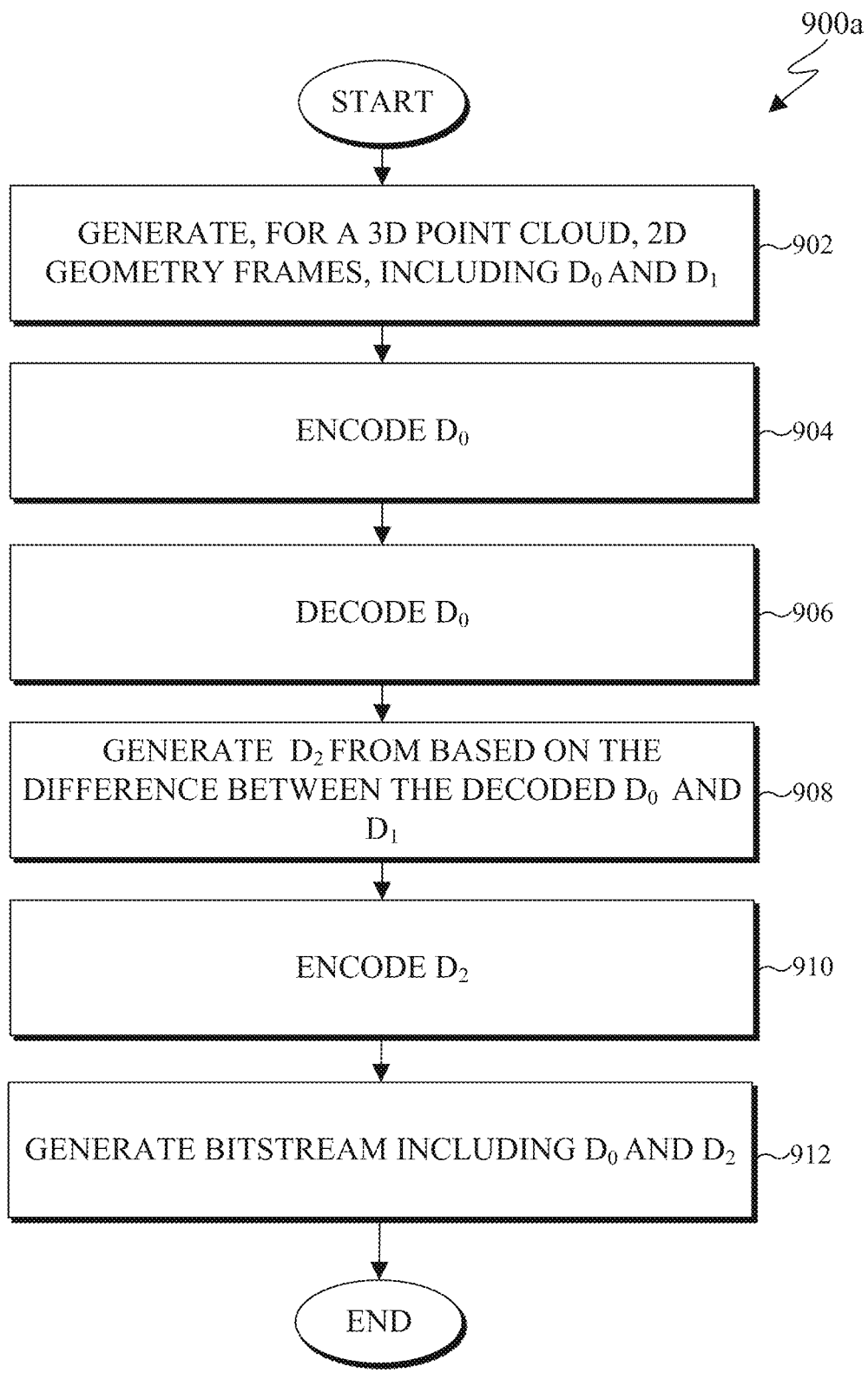
FIG. 9A illustrates example flowchart for decoding a point cloud in accordance with an embodiment of this disclosure.

FIG. 9A illustrates example flowchart for decoding a point cloud in accordance with an embodiment of this disclosure. The method 900a can be performed by the sever 104 or any of the client devices 106-116 of FIG. 1, the server 200 of FIG. 2, the electronic device 300 of FIG. 3, the encoder 510 of FIGS. 5A and 5B, the process 600 of FIG. 6A or any other suitable device or system. For ease of explanation, the method 900a is described as being performed by the encoder 510 of FIGS. 5A and 5B.

In step 902, the encoder 510 generates a first frame and a second frame that represent a 3D point cloud at different depths. The first and second frames each include a set of patches representing a cluster of points of the 3D point cloud In step 904, the encoder 510 encodes the first frame. In certain embodiments, the encoder 510 can select a particular quantization parameter for encoding the first frame. In certain embodiments, the encoder 510 is assign a predetermined quantization parameter for encoding the first frame. In certain embodiments, the encoder 510 is preconfigured to use all-intra configuration or random access configuration when encoding the first frame. In certain embodiments, the encoder 510 determines whether to use all-intra configuration or random access configuration when encoding the first frame. After the first frame is encoded, in step 906, the encoder 510 decodes the first frame.

In step 908, the encoder 510 generates a third frame based on a difference between the decoded first frame and the second frame.

After generating the third frame, in step 910, the encoder 510 encodes the third frame. In certain embodiments, the encoder 510 can select a particular quantization parameter for encoding the third frame. In certain embodiments, the encoder 510 assigns a predetermined quantization parameter for encoding the third frame. In certain embodiments, the encoder 510 is preconfigured to use all-intra configuration or random access configuration when encoding the first frame. For example, the encoder 510 uses the same encoding configuration (all-intra configuration or random access configuration) as used when encoding the first frame.

In step 912, the encoder 510 generates a bitstream. The bitstream can include the first frame and the third frame. The bitstream can be ultimately transmitted to a decoder, such as the decoder 550.

Although FIG. 9A illustrates one example of a method 900 for point cloud encoding, various changes may be made to FIG. 9A. For example, while shown as a series of steps, various steps in FIG. 9A could overlap, occur in parallel, or occur any number of times.

Figure 9B:
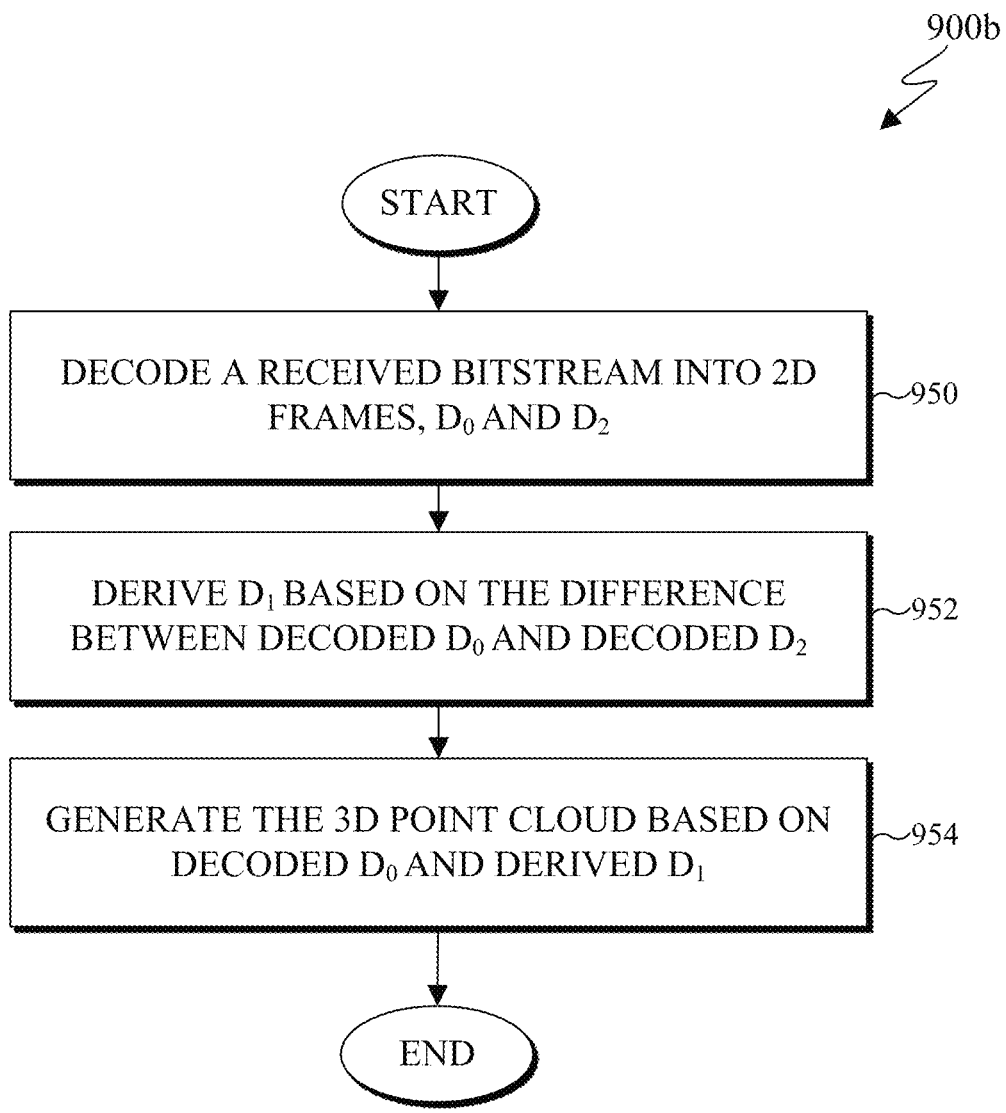
FIG. 9B illustrates example flowchart for encoding a point cloud in accordance with an embodiment of this disclosure.

FIG. 9B illustrates example flowchart for encoding a point cloud in accordance with an embodiment of this disclosure. The method 900b can be performed by the sever 104 or any of the client devices 106-116 of FIG. 1, the server 200 of FIG. 2, the electronic device 300 of FIG. 3, the decoder 550 of FIGS. 5A and 5C, or the process 650 of FIG. 6B or any other suitable device or system. For ease of explanation, the method 900b is described as being performed by the decoder 550 of FIGS. 5A and 5C.

The process begins with the decoder, such as decoder 550, receiving a compressed bitstream. The received bitstream can include an encoded point cloud that was mapped onto multiple 2D frames, compressed, and then transmitted and ultimately received by the decoder. In step 950, the decoder 550 decodes the bitstream. The decoder 550 decodes the compressed bitstream into multiple 2D frames corresponding to different depths of the 3D point cloud. The multiple 2D frames can also correspond to different attributes such as geometry and texture. The 2D frames include a set of patches repressing a cluster of pixels of the 3D point cloud. In certain embodiments, the decoder 550 receives the quantization parameter step size and the configuration type (all-intra configuration or random access configuration) from the encoder 510.

In step 952, the decoder 550 derives the second frame based on the first frame and the third frame. For example, the decoder 550 can add the first frame to the third frame, resulting in the second frame. In step 956, the decoder 550 generates, using the first and second depth image frames, the 3D point cloud.

Although FIG. 9B illustrates one example of a method 900 for point cloud decoding, various changes may be made to FIG. 9B. For example, while shown as a series of steps, various steps in FIG. 9B could overlap, occur in parallel, or occur any number of times.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the applicants to refer to structures known to those skilled in the relevant art and is not intended to invoke 35 U.S.C. § 112(f).

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An encoding device for point cloud encoding, the encoding device comprising:
   a processor configured to:
      generate, for a three-dimensional (3D) point cloud, first and second frames representing the 3D point cloud at different depths, wherein the first and second frames each include a set of patches representing a cluster of points of the 3D point cloud,
      encode the first frame,
      after encoding the first frame, decode the first frame,
      generate a third frame representing a difference between corresponding points of the second frame and the decoded first frame,
      encode the third frame, and
      generate a compressed bitstream including the encoded first frame and the encoded third frame; and
   a communication interface operably coupled to the processor, the communication interface configured to transmit the compressed bitstream,
   wherein when the first frame and the third frame are encoded using an all-intra configuration, the processor is further configured to:
      apply a first predetermined quantization parameter to the first frame, and
      apply a second predetermined quantization parameter to the third frame,
      wherein the first predetermined quantization parameter is smaller than the second predetermined quantization parameter.

2. The encoding device of claim 1, wherein the first frame and the second frame are related by a predefined surface thickness.

3. The encoding device of claim 1, wherein:
   the first frame represents a first set of frames at a first depth, the second frame represents a second set of frames at a second depth, the third frame represents a third set of frames, each frame of the third set of frames are based on the difference between corresponding points included in each respective frame of the second set of frames and the first set of frames that are decoded, and to encode the first frame and the third frame, the processor is configured to encode the first set of frames and the third set of frames using the all-intra configuration.

4. The encoding device of claim 3, wherein when the first frame and the third frame are encoded using the all-intra configuration:

the first predetermined quantization parameter is a single step size smaller than the second predetermined quantization parameter.

5. The encoding device of claim 3, wherein to encode the first set of frames and the third set of frames using the random access configuration, the processor is configured to:

identify an initial frame from the first set of frames;

apply a first quantization parameter to the initial frame;

apply a second quantization parameter to frames of the first set of frames, except to the initial frame; and apply a third quantization parameter to the third set of frames, wherein the first quantization parameter is smaller than the second quantization parameter and the second quantization parameter is smaller than the third quantization parameter.

6. The encoding device of claim 5, wherein:

the first quantization parameter is 30, the second quantization parameter is 31, and the third quantization parameter is 32.

7. A method for point cloud encoding, comprising:

generating, for a three-dimensional (3D) point cloud, first and second frames representing the 3D point cloud at different depths, wherein the first and second frames each include a set of patches representing a cluster of points of the 3D point cloud, encoding the first frame, after encoding the first frame, decoding the first frame, generating a third frame representing a difference between corresponding points of the second frame and the decoded first frame, encoding the third frame, generating a compressed bitstream including the encoded first frame and the encoded third frame; and transmitting the compressed bitstream, wherein when the first frame and the third frame are encoded using an all-intra configuration, the method comprises:

applying a first predetermined quantization parameter to the first frame, and applying a second predetermined quantization parameter to the third frame, wherein the first predetermined quantization parameter is smaller than the second predetermined quantization parameter.

8. The method of claim 7, wherein the first frame and the second frame are related by a predefined surface thickness.

9. The method of claim 7, wherein:

the first frame represents a first set of frames at a first depth, the second frame represents a second set of frames at a second depth, the third frame represents a third set of frames, each frame of the third set of frames are based on the difference between corresponding points included in each respective frame of the second set of frames and the first set of frames that are decoded, and encoding the first frame and the third frame, comprises encoding the first set of frames and the third set of frames using the all-intra configuration.

10. The method of claim 9, wherein when the first frame and the third frame are encoded using the all-intra configuration, the first predetermined quantization parameter is a single step size smaller than the second predetermined quantization parameter.

11. The method of claim 9, wherein encoding the first set of frames and the third set of frames using the random access configuration, comprises:

identifying an initial frame from the first set of frames;

applying a first quantization parameter to the initial frame;

applying a second quantization parameter to frames of the first set of frames, except to the initial frame; and applying a third quantization parameter to the third set of frames, wherein the first quantization parameter is smaller than the second quantization parameter and the second quantization parameter is smaller than the third quantization parameter.

12. The method of claim 11, wherein:

the first quantization parameter is 30, the second quantization parameter is 31, and the third quantization parameter is 32.

13. A non-transitory machine-readable medium containing instructions that when executed cause at least one processor of an electronic device to:

generate, for a three-dimensional (3D) point cloud, first and second frames representing the 3D point cloud at different depths, wherein the first and second frames each include a set of patches representing a cluster of points of the 3D point cloud, encode the first frame, after encoding the first frame, decode the first frame, generate a third frame representing a difference between corresponding points of the second frame and the decoded first frame, encode the third frame, generate a compressed bitstream including the encoded first frame and the encoded third frame; and transmit the compressed bitstream, wherein when the first frame and the third frame are encoded using an all-intra configuration, the instructions that when executed further cause at least one processor to:

apply a first predetermined quantization parameter to the first frame, and apply a second predetermined quantization parameter to the third frame, wherein the first predetermined quantization parameter is smaller than the second predetermined quantization parameter.

14. The non-transitory machine-readable medium of claim 13, wherein the first frame and the second frame are related by a predefined surface thickness.

15. The non-transitory machine-readable medium of claim 13, wherein:

the first frame represents a first set of frames at a first depth, the second frame represents a second set of frames at a second depth, the third frame represents a third set of frames, each frame of the third set of frames are based on the difference between corresponding points included in each respective frame of the second set of frames and the first set of frames that are decoded, and to encode the first frame and the third frame, the instructions when executed further cause the at least one processor to encode the first set of frames and the third set of frames using the all-intra configuration.

16. The non-transitory machine-readable medium of claim 15, wherein to encode the first set of frames and the third set of frames using the random access configuration, the instructions when executed further cause the at least one processor to:

identify an initial frame from the first set of frames;
apply a first quantization parameter to the initial frame;
apply a second quantization parameter to frames of the first set of frames, except to the initial frame; and
apply a third quantization parameter to the third set of frames,
wherein the first quantization parameter is smaller than the second quantization parameter and the second quantization parameter is smaller than the third quantization parameter.

17. The non-transitory machine-readable medium of claim 16, wherein:

the first quantization parameter is 30,
the second quantization parameter is 31, and
the third quantization parameter is 32.

18. The encoding device of claim 3, wherein when the first set of frames and the third set of frames are encoded using the all-intra configuration:

the first predetermined quantization parameter that is applied to the first set of frames is 31; and
the second predetermined quantization parameter that is applied to the third set of frames is 32.

19. The Method of claim 9, wherein when the first set of frames and the third set of frames are encoded using the all-intra configuration:

the first predetermined quantization parameter that is applied to the first set of frames is 31; and
the second predetermined quantization parameter that is applied to the third set of frames is 32.

20. The non-transitory machine-readable medium of claim 15, wherein, when the first set of frames and the third set of frames are encoded using the all-intra configuration:

the first predetermined quantization parameter that is applied to the first set of frames is 31; and
the second predetermined quantization parameter that is applied to the third set of frames is 32.

* * * * *